(12) United States Patent
Taylor

(10) Patent No.: US 8,156,282 B1
(45) Date of Patent: *Apr. 10, 2012

(54) SYSTEM AND METHOD FOR OPTIMIZING WRITE OPERATIONS IN STORAGE SYSTEMS

(75) Inventor: James A. Taylor, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/886,746

(22) Filed: Sep. 21, 2010

Related U.S. Application Data

(63) Continuation of application No. 11/590,446, filed on Oct. 31, 2006, now Pat. No. 7,822,921.

(51) Int. Cl.
*G06F 12/16* (2006.01)
(52) U.S. Cl. ....... 711/114; 711/156; 714/6.24; 714/800; 714/804
(58) Field of Classification Search .................. 711/114, 711/156; 714/6.24, 800, 804
See application file for complete search history.

(56) References Cited

U.S. PATENT DOCUMENTS

| | | | |
|---|---|---|---|
| 3,876,978 A | 4/1975 | Bossen et al. |
| 4,092,732 A | 5/1978 | Ouchi |
| 4,201,976 A | 5/1980 | Patel |
| 4,205,324 A | 5/1980 | Patel |
| 4,375,100 A | 2/1983 | Tsuji et al. |
| 4,467,421 A | 8/1984 | White |
| 4,517,663 A | 5/1985 | Imazeki et al. |
| 4,547,882 A | 10/1985 | Tanner |
| 4,667,326 A | 5/1987 | Young et al. |
| 4,688,221 A | 8/1987 | Nakamura et al. |
| 4,722,085 A | 1/1988 | Flora et al. |
| 4,755,978 A | 7/1988 | Takizawa et al. |
| 4,761,785 A | 8/1988 | Clark et al. |
| 4,775,978 A | 10/1988 | Hartness |
| 4,796,260 A | 1/1989 | Schilling et al. |
| 4,817,035 A | 3/1989 | Timsit |
| 4,825,403 A | 4/1989 | Gershenson et al. |

(Continued)

FOREIGN PATENT DOCUMENTS

EP    1 324 200 A2    7/2003

(Continued)

OTHER PUBLICATIONS

Anvin, Peter H, "*The Mathematics of RAID 6*," Dec. 2004.

(Continued)

*Primary Examiner* — Jae Yu
(74) *Attorney, Agent, or Firm* — Cesari and McKenna, LLP

(57) ABSTRACT

Embodiments of the present invention provide a method, system, and computer program product for optimizing I/O operations performed by a storage server operating on behalf of multiple clients to access data on a plurality of storage devices (disks). Embodiments of the present invention eliminate the need for selected read operations to write new data to physical data blocks by zeroing the physical data blocks to which new data will be written. Additionally, the need for reading old parity to compute new parity is eliminated. Instead, new parity is computed from the data to be written without the need of old parity or the storage server sends a command to a disk that stores parity. A module implemented at the disk that stores parity executes the command without reading, by the storage server, old parity. Eliminating the need for reading old data and for reading old parity eliminates some rotation latency and improves overall system's performance.

16 Claims, 9 Drawing Sheets

U.S. PATENT DOCUMENTS

| | | | |
|---|---|---|---|
| 4,837,680 | A | 6/1989 | Crockett et al. |
| 4,847,842 | A | 7/1989 | Schilling |
| 4,849,929 | A | 7/1989 | Timsit |
| 4,849,974 | A | 7/1989 | Schilling et al. |
| 4,849,976 | A | 7/1989 | Schilling et al. |
| 4,870,643 | A | 9/1989 | Bultman et al. |
| 4,899,342 | A | 2/1990 | Potter et al. |
| 4,989,205 | A | 1/1991 | Dunphy, Jr. et al. |
| 4,989,206 | A | 1/1991 | Dunphy, Jr. et al. |
| 5,077,736 | A | 12/1991 | Dunphy, Jr. et al. |
| 5,088,081 | A | 2/1992 | Farr |
| 5,101,492 | A | 3/1992 | Schultz et al. |
| 5,128,810 | A | 7/1992 | Halford |
| 5,148,432 | A | 9/1992 | Gordon et al. |
| RE34,100 | E | 10/1992 | Hartness |
| 5,163,131 | A | 11/1992 | Row et al. |
| 5,166,936 | A | 11/1992 | Ewert et al. |
| 5,179,704 | A | 1/1993 | Jibbe et al. |
| 5,202,979 | A | 4/1993 | Hillis et al. |
| 5,208,813 | A | 5/1993 | Stallmo |
| 5,210,860 | A | 5/1993 | Pfeffer et al. |
| 5,218,689 | A | 6/1993 | Hotle |
| 5,233,618 | A | 8/1993 | Glider et al. |
| 5,235,601 | A | 8/1993 | Stallmo et al. |
| 5,237,658 | A | 8/1993 | Walker et al. |
| 5,257,367 | A | 10/1993 | Goodlander et al. |
| 5,271,012 | A | 12/1993 | Blaum et al. |
| 5,274,799 | A | 12/1993 | Brant et al. |
| 5,305,326 | A | 4/1994 | Solomon et al. |
| 5,351,246 | A | 9/1994 | Blaum et al. |
| 5,375,128 | A | 12/1994 | Menon et al. |
| 5,410,667 | A | 4/1995 | Belsan et al. |
| 5,479,633 | A * | 12/1995 | Wells et al. ............ 711/103 |
| 5,537,567 | A | 7/1996 | Galbraith et al. |
| 5,579,475 | A | 11/1996 | Blaum et al. |
| 5,623,595 | A | 4/1997 | Bailey |
| 5,657,468 | A | 8/1997 | Stallmo et al. |
| 5,742,752 | A | 4/1998 | DeKoning |
| 5,805,788 | A | 9/1998 | Johnson |
| 5,812,753 | A | 9/1998 | Chiariotti |
| 5,819,292 | A | 10/1998 | Hitz et al. |
| 5,862,158 | A | 1/1999 | Baylor et al. |
| 5,884,098 | A | 3/1999 | Mason, Jr. |
| 5,948,110 | A | 9/1999 | Hitz et al. |
| 5,950,225 | A | 9/1999 | Kleiman |
| 5,963,962 | A | 10/1999 | Hitz et al. |
| 6,038,570 | A | 3/2000 | Hitz et al. |
| 6,092,215 | A | 7/2000 | Hodges et al. |
| 6,138,125 | A | 10/2000 | DeMoss |
| 6,138,126 | A | 10/2000 | Hitz et al. |
| 6,138,201 | A | 10/2000 | Rebalski |
| 6,158,017 | A | 12/2000 | Han et al. |
| 6,223,300 | B1 | 4/2001 | Gotoh |
| 6,247,157 | B1 | 6/2001 | Edirisooriya |
| 6,289,356 | B1 | 9/2001 | Hitz et al. |
| 6,532,548 | B1 | 3/2003 | Hughes |
| 6,557,123 | B1 | 4/2003 | Wiencko et al. |
| 6,571,326 | B2 | 5/2003 | Spiegel et al. |
| 6,581,185 | B1 | 6/2003 | Hughes |
| 6,671,772 | B1 | 12/2003 | Cousins |
| 6,742,137 | B1 | 5/2004 | Frey, Jr. |
| 6,779,095 | B2 | 8/2004 | Selkirk et al. |
| 6,993,701 | B2 | 1/2006 | Corbett et al. |
| 7,073,115 | B2 | 7/2006 | English et al. |
| 7,203,892 | B2 | 4/2007 | Corbett et al. |
| 7,318,190 | B2 * | 1/2008 | Edirisooriya ............ 714/800 |
| 7,328,305 | B2 | 2/2008 | Kleiman et al. |
| 7,409,625 | B2 | 8/2008 | Corbett et al. |
| 2002/0016900 | A1 * | 2/2002 | Miller ............ 711/220 |
| 2002/0083037 | A1 | 6/2002 | Lewis et al. |
| 2002/0124137 | A1 | 9/2002 | Ulrich et al. |

FOREIGN PATENT DOCUMENTS

| | | |
|---|---|---|
| WO | WO-01/13236 A1 | 2/2001 |
| WO | WO-02/29539 A2 | 4/2002 |
| WO | WO 2004/001600 | 12/2003 |

OTHER PUBLICATIONS

Auspex 4Front NS2000, System Architecture, Network-Attached Storage for a New Millennium, Auspex Engineering Technical Report 24, Jan. 1999.

Bestavros, Azer, et al., *Reliability and Performance of Parallel Disks*, Technical Memorandum 45312-891206-01TM, AT&T, Bell Laboratories, Department 45312, Holmdel, NJ, Dec. 1989.

Bitton, Dina, *Disk Shadowing*, Proceedings of the 14$^{th}$ VLDB Conference, LA, CA (1988).

Blaum, Mario, et al., *Evenodd: An Optimal Scheme for Tolerating Double Disk Failures in RAID Architectures*, Computer Architectures News, Association for Computing Machinery, New York, US, vol. 22, No. XP000450355, Apr. 1, 1994.

Blaum, Mario, et al., *Evenodd: An Efficient Scheme for Tolerating Double Disk Failures in RAID Architectures*, IEEE Transactions on Computers, vol. 44, No. 2, Feb. 1995, pp. 192-202.

Bultman, David L., *High Performance SCSI Using Parallel Drive Technology*, In Proc. BUSCON Conf., pp. 40-44, Anaheim, CA, Feb. 1988.

Chen, Peter et al., *Two Papers on RAIDs*. Technical Report, CSD-88-479, Computer Science Division, Electrical Engineering and Computer Sciences, University of California at Berkeley (1988).

Chen, Peter M., et al., *An Evaluation of Redundant Arrays of Disks Using an Amdahl 5890*, Performance Evaluation, pp. 74-85, 1990—check to see if exact same as one in WAFL.

Chen, Peter M.., et al, *Maximizing Performance in a Striped Disk Array*, Proc. 1990 ACM SIGARCH 17th Intern. Symp. on Comp. Arch., Seattle, WA, May 1990, pp. 322-331.

Chen, Peter M., et al., *RAID: High Performance, Reliable Secondary Storage*, ACM Computing Surveys, 26(2):145-185, Jun. 1994.

Chervenak, Ann L., *Performance Measurement of the First RAID Prototype*, Technical Report UCB/CSD 90/574, Computer Science Division (EECS), University of California, Berkeley, May 1990.

Copeland, George, et al., *A Comparison of High-Availability Media Recovery techniques*, in Proc. ACM-SIGMOD Int. Conf. Management of Data, 1989.

Courtright II, William V., et al., *RAIDframe: A Rapid Prototyping Tool for RAID Systems*, Computer Science Technical Report CMU-CS97-142, Carnegie Mellon University, Pittsburgh, PA 15213, Jun. 4, 1997.

Evans *The Tip of the Iceberg:RAMAC Virtual Array—Part I*, Technical Support, Mar. 1997, pp. 1-4.

Gibson, Garth A., et al., *Coding Techniques for Handling Failures in Large Disk Arrays*, Technical Report UCB/CSD 88/477, Computer Science Division, University of California, (Jul. 1988.).

Gibson, Garth A., et al., *Failure Correction Techniques for Large Disk Arrays*, In Proceedings Architectural Support for Programming Languages and Operating Systems, Boston, Apr. 1989, pp. 123-132.

Gibson, Garth A., et al., *Strategic Directions in Storage I/O Issues in Large-Scale Computing*, ACM Computing Survey, 28(4):779-93, Dec. 1996.

Goldick, Jonathan S., et al., *Multi-resident AFS: An Adventure in Mass Storage*, In Proceedings of the 1995 USENIX Technical Conference, pp. 47-58, Jan. 1995.

Graham, Susan L., et al., *Massive Information Storage, Management, and Use*, (NSF Institutional Infrastructure Proposal), Technical Report No. UCB/CSD 89/493, Jan. 1989.

Gray, Jim et al., *Parity striping of disc arrays: Low-Cost Reliable Storage with Acceptable Throughput*. In Proceedings of the 16th Very Large Data Bases Conference, pp. 148-161, Brisbane, Australia, 1990.

Grimes, DW Martinez, *Two Dimensional Parity Error Correction Procedure*, IBM Technical Disclosure Bulletin 2686-2689, Oct. 1982.

Grimes, DW Martinez, *Vertical Parity Generator for Two Dimensional Parity*, IBM Technical Disclosure Bulletin 2682-2685, Oct. 1982.

Hellerstein, Lisa, et al,. *Coding Techniques for Handling Failures in Large Disk Arrays*. In Algorithmica vol. 2, Nr. 3, 182-208 (1994).

Hitz, David, *TR3002 File System Design for a NFS File Server Appliance*, Network Appliance, Inc.

Hughes, James, et al., *High Performance RAIT*, Tenth NASA Goddard Conference on Mass Storage Systems and Technologies and Nineteenth IEEE Symposium on Mass Storage Systems, Adelphi, Maryland, USA, Apr. 2002.

Johnson, Theodore, et al, *Tape Group Parity Protection*, IEEE Symposium on Mass Storage, pp. 72-79, Mar. 1999.

Katz, Randy H. et al., *Disk System Architectures for High Performance Computing*, undated.

Kent, Jack et al., *Optimizing Shadow Recovery Algorithms*, IEEE Transactions on Software Engineering, 14(2):155-168, Feb. 1988.

Kim, Michelle Y., *Synchronized Disk Interleaving*, IEEE Transactions on Computers, C-35(11):978-988, Nov. 1986.

Kim, Michelle, et al., *Asynchronous Disk Interleaving Approximating Access Delays*, IEEE Transactions on Computers, vol. 40, No. 7, Jul. 1991, pp. 801-810.

Lawlor, F. D., *Efficient Mass Storage Parity Recovery Mechanism*, IBM Technical Disclosure Bulletin 24(2):986-987, Jul. 1981.

Lee, Edward K., et al., *RAID-II: A Scalable Storage Architecture for High-Bandwidth Network File Service*, Technical Report UCB/CSD 92/672, (Feb. 1992).

Lee, Edward K., et al., *The Performance of Parity Placements in Disk Arrays*, IEEE Transactions on Computers, vol. 42 No. 6, Jun. 1993, 14 pages.

Li, Don, et al., *Authors' Reply*, IEEE Transactions on Communications, 46:575, May 1998.

*Limited Distributed DASD Checksum, A RADI Hybrid*, IBW Technical Disclosure Bulletin, IBM Corp. New York, US vol. 35. No. 4A, XP000314813, Sep. 1, 1992.

Livny, Miron, et al., *Multi-Disk Management Algorithms*, In Proceedings of the ACM International Conference on Measurement and Modeling of Computer Systems (SIGMETRICS), pp. 69-77, Banff, Alberta, Canada, May 1987.

Meador, Wes E., *Disk Array Systems*, Proceedings of COMPCON, 1989, pp. 143-146.

Menon, Jai, et al., *Methods for Improved Update Performance of Disk Arrays*, IBM Almaden Research Center, IEEE, Jan. 1992, 10 pages.

Menon, Jai, et al., *Floating Parity and Data Disk Arrays*, Journal of Parallel and Distributed Computing, Boston: Academic Press. Inc., vol. 17 No. 1 and 2, Jan./Feb. 1993, 13 pages.

Microsoft Computer Dictionary, $5^{th}$ Edition, 2002, p. 211.

Ng, Spencer, et al., *Trade-Offs Between Devices and Paths in Achieving Disk Interleaving*, IEEE International Symposium on Computer Architecture, 1988, pp. 196-201.

Ng, Spencer, *Some Design Issues of Disk Arrays*, Proceedings of COMPCON Spring '89, pp. 137-142. IEEE, 1989.

Park, Arvin, et al., *Providing Fault Tolerance in Parallel Secondary Storage Systems*, Technical Report CS-TR-057-86, Princeton, Nov. 1986.

Patel, Arvind M., *Adaptive Cross-Parity (AXP) Code for a High-Density Magnetic Tape Subsystem*, IBM Technical Disclosure Bulletin 29(6):546-562, Nov. 1985.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley (1987).

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 (Sep. 1988).

Patterson, David A., et al., *Introduction to Redundant Arrays of Inexpensive Disks (RAID)*. In IEEE Spring 89 COMPCON, San Francisco, IEEE Computer Society Press, Feb. 27-Mar. 3, 1989, pp. 112-117.

Storagesuite, *Performance Without Compromise: The Virtual Storage Architecture*, catalogue, 1997.

Reddy, A. L. Narasimha, et al., *An Evaluation of Multiple-Disk I/O Systems*, IEEE Transactions on Computers, vol. 38, No. 12, Dec. 1989, pp. 1680-1690.

Scheuermann, Peter, et al., *Data Partitioning and Load Balancing in Parallel Disk Systems*, The VLDB Journal, vol. 7, Springer-Verlag, Copyright Feb. 1998, 19 pages.

Schulze, Martin E., *Considerations in the Design of a RAID Prototype*, Computer Science Division, Department of Electrical Engineering and Computer Sciences, Univ. of CA, Berkley, Aug. 25, 1988.

Schulze, Martin., et al., *How Reliable is a RAID?*, Proceedings of COMPCON, 1989, pp. 118-123.

Shirriff, Kenneth W., *Sawmill:A Logging File System for a High-Performance RAID Disk Array*, CSD-95-862, Jan. 1995.

Stanek, William R., *Microsoft Windows 2000 Server: Administering Volume Sets and RAID Arrays*, Jan. 10, 2006, (http://www.microsoft.com/technet/prodtechnol/windows2000serv/maintain/operate/11w2kada.mspx), (Printed 1999).

Stodolsky, Daniel, et al., *Parity Logging Overcoming the Small Write Problem in Redundant Disk Array*, School of Computer Science and Department of Electrical and Computer Engineering, Carnegie Mellon University, IEEE, May 1993, 12 pages.

Stonebraker, Michael, et al., *The Design of XPRS*, Proceedings of the $14^{th}$ VLDB Conference, LA, CA (1988).

Tanabe, Takaya, et al, *Redundant Optical Storage System Using DVD-RAM Library*, IEEE Symposium on Mass Storage, pp. 80-87, Mar. 1999.

Tekram—"About RAID 6".

Tweten, David, *Hiding Mass Storage Under UNIX: NASA's MSS-II Architecture*, IEEE Symposium on Mass Storage, pp. 140-145, May 1990.

Weikum, Gerhard, et al., *Dynamic File Allocation in Disk Arrays*, ETH Zurich, Department of Computer Science Information Systems—Databases, ACM SIGMOD Record, vol. 20, Issue 2, Jun. 1991, 10 pages.

Wilkes, John, et al., *The HP AutoRAID hierarchical storage system*, ACM Transactions on Computer Systems, Feb. 1996, vol. 14, pp. 108-136.

IBM, *Information Technology, SCSI Block Commands—3 (SBC-3)*, Working DraftProject American National Standard, T10/1799-D, Revision 7, Sep. 2006, 174 pages.

Holder, G. et al., "XOR Commands on SCSI Disk Drives," Internet Citation URL: http://www.t10.org/ftp/t10/document.94/94-111r8.pdf, Retrieved Dec. 13, 2005, 30 pages.

Huysing-Solles, H., "PCT Notification of Transmittal of the International Search Report and the Written Opinion of the International Searching Authority, or the Declaration," Network Appliance, Inc., International Filing No. PCT/US2007/022962, International Filing Date: Oct. 31, 2007, Date of Document Mailing: Aug. 25, 2009, 13 pages.

\* cited by examiner

| DISK 0 ROW PARITY | DISK 1 | DISK 2 | DISK 3 | DISK 4 | DISK 5 DIAGONAL PARITY |
|---|---|---|---|---|---|
| 0 | 1 | 2 | 3 | 4 | 0 |
| 1 | 2 | 3 | 4 | 0 | 1 |
| 2 | 3 | 4 | 0 | 1 | 2 |
| 3 | 4 | 0 | 1 | 2 | 3 |

FIG. 8

SYSTEM AND METHOD FOR OPTIMIZING WRITE OPERATIONS IN STORAGE SYSTEMS

CROSS-REFERENCE TO RELATED APPLICATIONS

The present application is a continuation of commonly assigned U.S. patent application Ser. No. 11/590,446, which was filed on Oct. 31, 2006, by James A. Taylor for a SYSTEM AND METHOD FOR OPTIMIZING WRITE OPERATIONS IN STORAGE SYSTEMS, now issued as U.S. Pat. No. 7,822,921, on Oct. 26, 2010, and is hereby incorporated by reference.

BACKGROUND OF THE INVENTION

1. Field of the Invention

The present invention pertains to storage systems, and more particularly, to optimizing data write operations.

2. Background Information

A storage server is a processing system adapted to store and retrieve data on behalf of one or more client processing systems ("clients") in response to input/output (I/O) client requests. A storage server can be used for many different purposes, such as to provide multiple users with access to shared data or to backup data.

One example of a storage server is a file server. A file server operates on behalf of one or more clients to store and manage shared files in a set of mass storage devices, such as magnetic or optical storage disks or tapes. The mass storage devices may be organized into one or more volumes of Redundant Array of Independent (or Inexpensive) Disks (RAID). Another example of a storage server is a device, which provides clients with block-level access to stored data, rather than file-level access, or a device, which provides clients with both file-level access and block-level access.

In a storage server, data gets corrupted or lost from time to time, for example, upon the failure of one of the mass storage devices. Consequently, virtually all modern storage servers implement techniques for protecting the stored data. Currently, these techniques involve calculating a data protection value (e.g., parity) and storing the parity in various locations. Parity may be computed as an exclusive-OR (XOR) of data blocks in a stripe spread across multiple disks in a disk array. In a single parity scheme, e.g. RAID-4 or RAID-5, an error can be corrected in any block in the stripe using a single parity block (also called "row parity"). In a dual parity scheme, e.g. RAID Double Parity (RAID-DP), a technique invented by Network Appliance Inc. of Sunnyvale, Calif., errors resulting from a two-disk failure can be corrected using two parity blocks. The first one is a row parity block, which is computed as a result of XOR of data blocks in a stripe. The second one is diagonal parity, which may be computed as an exclusive OR operation (XOR) of data blocks in a diagonal set.

Although the parity protection schemes described above provide data protection, to modify a data block on a disk and thus to compute new parity, multiple read and write operations need to be performed. For example, to modify a data block(s) under one RAID-5 scheme, a parity block is read. Data from data blocks that will be modified are also read. Then an exclusive OR (XOR) operation is performed on the parity block and the data blocks. To compute new parity, the result of the XOR of the previous step is XOR'ed with the new data. The new data and the new parity are written to the disk. Thus, two read operations (one of the parity block and one of the data blocks) and two writes (one of the new data and one of the new parity) are required. This process is sometimes referred to as "Read Modify Write" or "Parity by Subtraction Write." In some systems, performing a preliminary read operation requires the system to wait for the storage devices (e.g. disks) to rotate back to a previous position before performing the write operation. Thus, performing multiple read operations to modify data blocks results in rotation latency, which impacts overall system performance.

There are known solutions that attempt to eliminate selected read operations. According to one known solution, an entire stripe has to be written, including the new parity. This technique is referred to as a "Full Stripe Write." However, as a file system ages, its ability to do full stripe writes decreases.

Another solution, which eliminates selected read operations, stores in memory cache data from the data blocks where the new data is to be written. Since the old data are currently in cache, the old data do not need to be read prior to writing the new data. This solution, however, requires a significant amount of memory cache and still may not be very effective.

Accordingly, what is needed is a method and system that optimizes I/O operations so as to eliminate additional latency associated with performing multiple read operations.

SUMMARY OF THE INVENTION

Embodiments of the present invention provide a method, system, and computer program product for optimizing I/O operations performed by a storage server operating on behalf of multiple clients to access and retrieve data on a plurality of storage devices, such as disks. Embodiments of the present invention zero free physical data blocks on the disks. When a client system makes an access request to the storage server to write new data, the storage server decodes the request and issues an internal command to write data to physical data blocks on one or more disks. Since physical data blocks to which new data are written are zeroed, embodiments of the present invention eliminate the need for reading these data blocks to write new data. Additionally, embodiments of the present invention eliminate the need for reading old parity to compute new parity for a stripe in which one or more physical data blocks are modified. Instead, new parity is computed completely from data to be written or the storage server issues a command(s) to a disk that stores parity for the stripe in which new data is to be written. A module at the disk receives the command and new data to be written (or a result of the XOR operation on the new data), and computes new parity for the stripe where the new data is to be written without the need for the storage server to read old parity. Eliminating the need for reading physical data blocks to which new data will be written as well as for reading old parity eliminates some rotation latency and increases performance of the storage server.

Further, the present invention provides increased data protection in RAID-4 and RAID-5 when one disk failed and data cannot be read from one or more data blocks in another disk (i.e., that disk has a media error) or in a dual parity scheme RAID with two failed drives and data cannot be read from one or more data blocks in another disk. Knowing that one of the failed disks stores zero values enables the storage server to recover data from the disk that has a media error. This data would not be recoverable otherwise in RAID-4 and RAID-5 or dual parity RAID systems.

In yet another embodiment, when the storage operating system implements a write-in-place (WIPL) mechanism to write data, the present invention optimizes write operations. That is, the present invention leverages an ability of the operating system utilizing WIPL mechanism to read old data into a memory, write it elsewhere on a disk, and provide a pointer to an address in the memory where the old data is stored so that it could be accessed. Since old data has already been read, an embodiment of the present invention eliminates the need for reading old data to compute new parity. Rather, a command is sent to a disk that stores parity for a stripe where data is to be modified. A module at the disk reads old parity and computes new parity, thereby eliminating the need for reading old parity by the storage server.

The present invention can also be implemented to optimize write operations both in a single parity data protection scheme and in a dual parity data protection scheme.

Other aspects of the invention will become apparent from the following detailed description taken in conjunction with the accompanying drawings, which illustrate the principles of the invention by way of example.

BRIEF DESCRIPTION OF THE DRAWINGS

One or more embodiments of the present invention are illustrated by way of example and not limitation in the figures of the accompanying drawings, in which like references indicate similar elements and in which:

FIG. 8 shows exemplary diagonal sets in RAID-DP system; and

DETAILED DESCRIPTION OF AN ILLUSTRATIVE EMBODIMENT

Figure 1A:
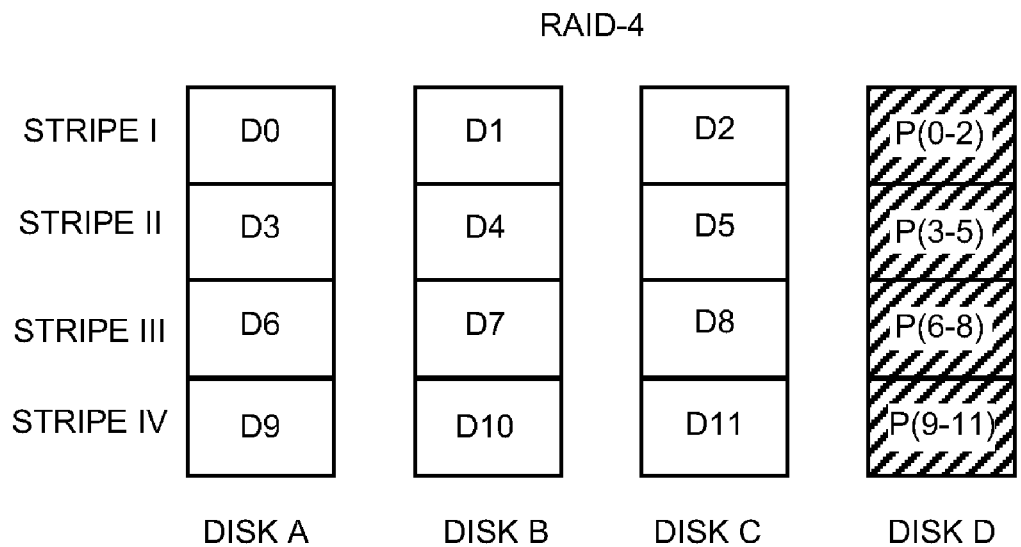
FIGS. 1A and 1B show arrangements of data blocks on disks according to RAID-4 and RAID-5, respectively.

Embodiments of the present invention provide a method, system, and computer program product for optimizing I/O operations performed by a storage server operating on behalf of multiple clients to access and retrieve data on a plurality of storage devices, such as disks. Embodiments of the present invention zero free physical data blocks on the disks. When a client system makes an access request to the storage server to write new data, the storage server decodes the request and issues an internal command to write data to physical data blocks on one or more disks. Since physical data blocks to which new data are written have been zeroed, embodiments of the present invention eliminate the need for reading these data blocks to write new data. Additionally, embodiments of the present invention eliminate the need for reading old parity to compute new parity for a stripe in which one or more physical data blocks are modified. Instead, the storage server issues a command(s) to a disk that stores parity for the stripe in which new data is to be written. A module at the disk receives the command and new data to be written (or a result of the XOR operation on the new data), and computes new parity for the stripe where the new data is to be written without the need for the storage server to read old parity. Eliminating the need for reading physical data blocks to which new data will be written as well as for reading old parity eliminates some rotation latency and increases performance of the storage server.

Other advantages of the present invention include potential improvements in write performance in a degraded mode. In addition, the present invention provides for data recovery in a situation when one disk fails and another disk has a media error in RAID-4 or RAID-5 and provides for data recovery in a situation when two disks fail and another disk has a media error in a dual parity RAID system. Furthermore, the present invention optimizes write performance in a file system supporting a "write-in-place" method. By providing a pointer to old data read into a memory, the present invention eliminates the need to read old data from a data block where new data are written. Further details on how the write optimization technique is implemented are hereinafter described.

Before proceeding with a more detailed description of the illustrative embodiment, the following definitions are provided. As used herein, the term "data block" can be any chunk of data that a system is capable of recognizing and manipulating as a distinct entity. Accordingly, as used herein, "physical data blocks" are blocks that store data being written to the disks and "parity blocks" are blocks that store parity to protect the data stored in the physical data blocks.

As used herein, "old data" means data that is currently stored in physical data blocks; "new data" refers to data that is written to data blocks. "Old parity" refers to parity computed before a write command is executed, that is, before new data are written to a data block(s). "New parity" refers to parity computed after a write command is executed, that is, after new data are written to a data block(s). "Row parity" refers to parity computed as an exclusive-OR (XOR) of data blocks in a particular stripe.

Figure 1B:
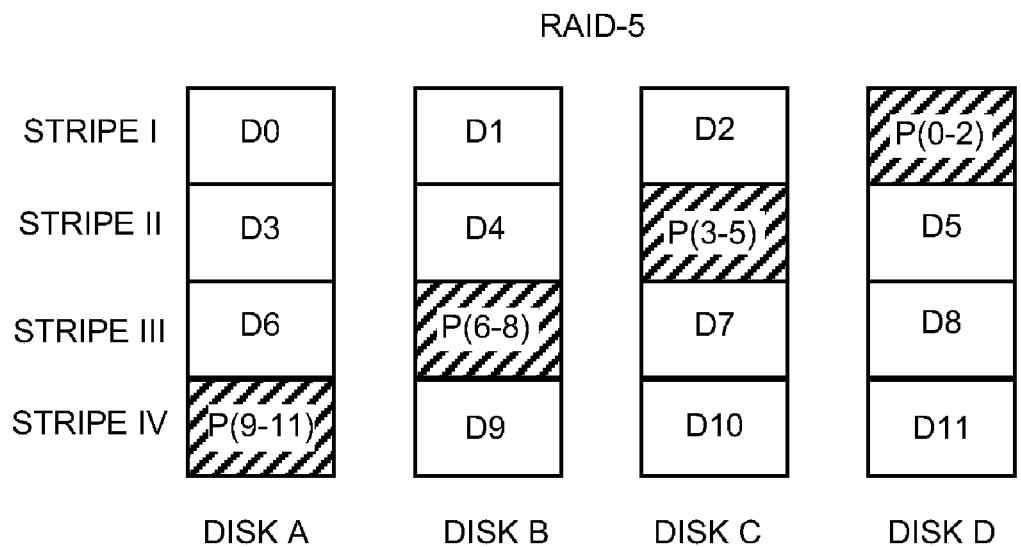

Referring now to FIGS. 1A and 1B, they show arrangements of data blocks on storage devices according to RAID-4 and RAID-5 respectively. In FIGS. 1A and 1B, data sent to a storage server from a client(s) for storage as part of a write operation may first be divided up into fixed-size, e.g., four Kilo Byte, blocks (e.g. D0, D1, etc.), which are then formed into groups that are stored as physical data blocks in a "stripe" (e.g. Stripe I, Stripe II, etc.) spread across multiple disks in an array. Row parity, e.g. an exclusive-OR (XOR) of the data in the stripe, is computed and may be stored in a parity protection block on disk D. The location of the row parity depends on the type of protection scheme or protocol implemented. FIG. 1A shows a RAID-4 scheme in which the row parity, e.g. P(0-2), P(3-5), P(6-8), and P(9-11) are stored in a dedicated disk (disk D). FIG. 1B shows a RAID-5 scheme in which the row parity is distributed across disks in the array. A dual parity protection scheme is described in greater detail in reference to FIG. 8.

1. System Architecture

Figure 2:
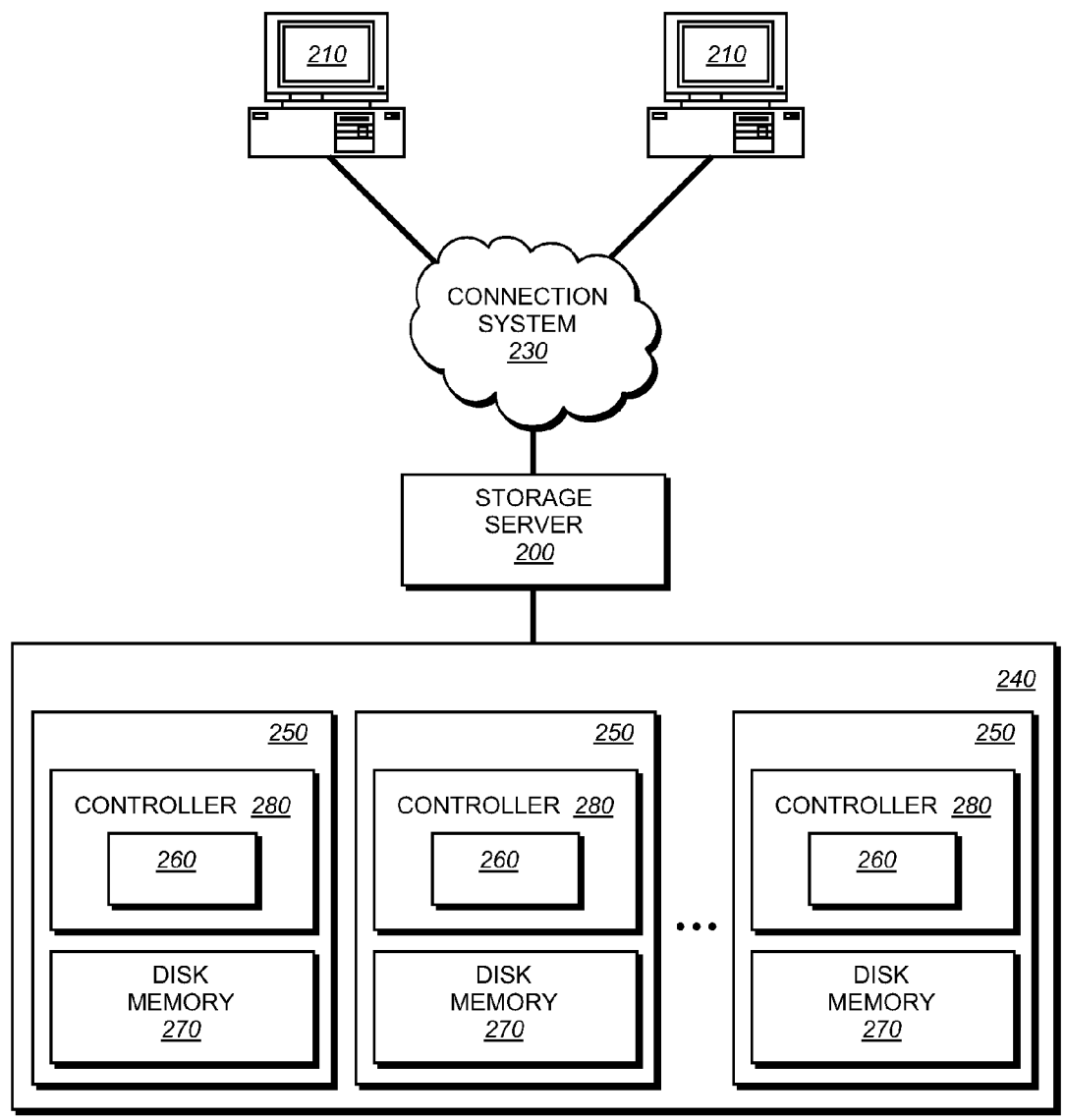
FIG. 2 shows a network environment that includes a storage server according to an embodiment of the present invention.

As noted, a mechanism for eliminating selected read operations can be implemented in a storage server, such as the one shown in FIG. 2. FIG. 2 shows a network environment that includes multiple clients 210, a storage server 200, and a disk subsystem 240. Storage server 200 operates on behalf of clients 210 to store and manage shared files in a set of mass storage devices, such as magnetic or optical storage based disks or tapes. As previously described, storage server 200 can also be a device that provides clients 210 with block-level access to stored data, rather than file-level access, or a device which provides clients with both file-level access and block-level access. Storage server 200 in FIG. 2 is coupled locally to a set of clients 210 over connection system 230, such as a local area network (LAN), a wide area network (WAN), metropolitan are network (MAN) or the Internet. The connection system 230 may be embodied as an Ethernet network or a Fibre Channel (FC) network. Each client 210 may communicate with the storage server 200 over the connection system 230 by exchanging discrete frames or packets of data according to pre-defined protocols, such as TCP/IP.

Each of the clients 210 may be, for example, a conventional personal computer (PC), workstation, or the like. The storage server 200 receives various requests from the clients 210 and responds to these requests. The storage server 200 may have a distributed architecture; for example, it may include a separate N- ("network") blade and D- (disk) blade (not shown). In such an embodiment, the N-blade is used to communicate with clients 210, while the D-blade includes the file system functionality and is used to communicate with the disk subsystem 240. The N-blade and D-blade communicate with each other using an internal protocol. Alternatively, the storage server 200 may have an integrated architecture, where the network and data components are all contained in a single box and can be tightly integrated. The storage server 200 further may be coupled through a switching fabric to other similar storage servers (not shown) which have their own local disk subsystems. In this way, all of the disk subsystems 240 can form a single storage pool or a cluster, to which any client of any of the file servers has access.

Disk subsystem 240 includes a set of mass storage devices, such as disks 250. Each disk 250 includes a controller 280, which implements a command executing module 260, the functionality of which will be described herein. Thus, in a preferred embodiment, command executing module 260 is implemented as firmware embedded into a hardware device, such as controller 280. In another embodiment, command executing module 260 can be implemented as software stored in disk memory 270.

Figure 3:
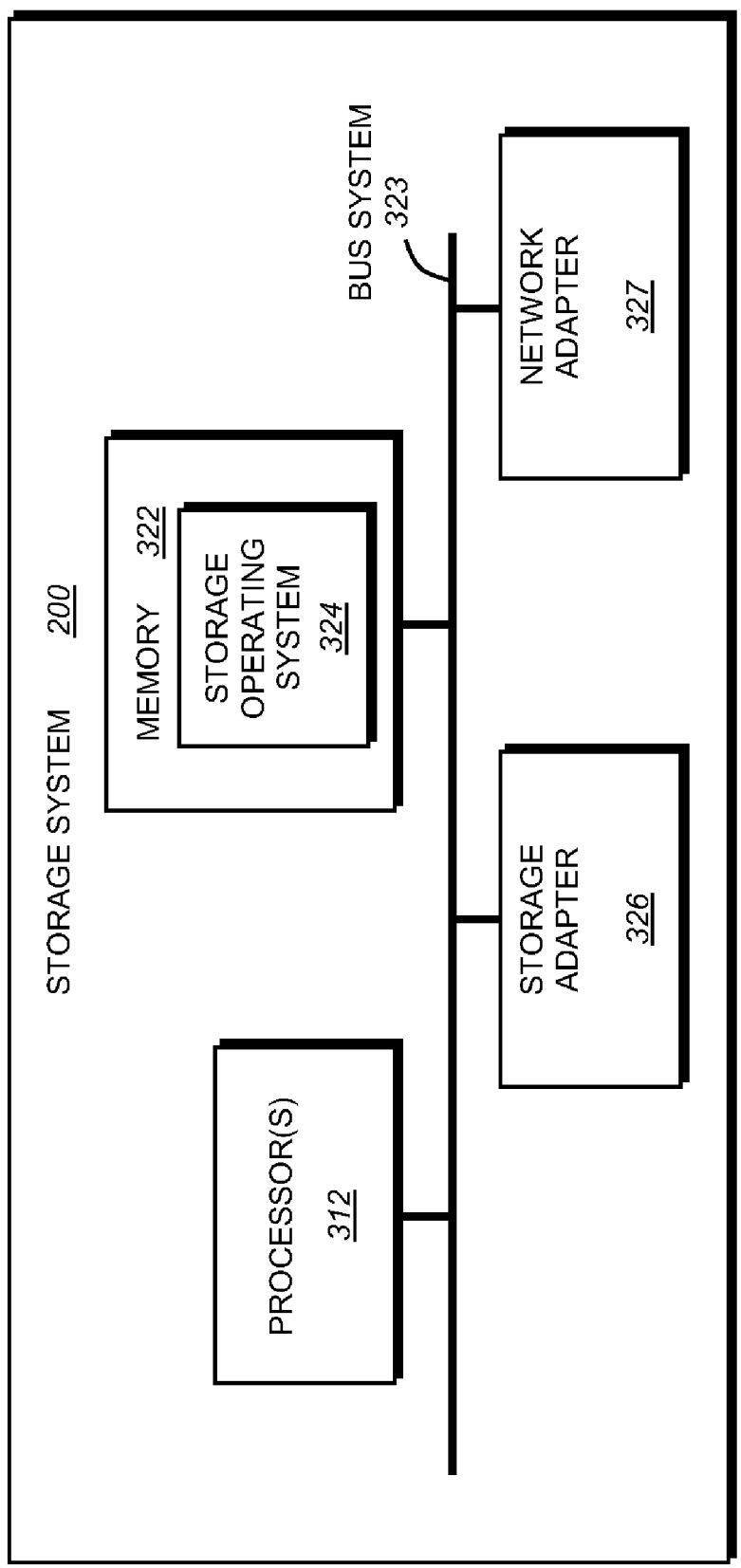
FIG. 3 is a diagram showing architecture of the storage server shown in FIG. 2 according to an embodiment of the present invention.

FIG. 3 is a diagram showing the architecture of the storage server 200 according to an embodiment of the present invention. The storage server 200 includes one or more processor(s) 321 and memory 322 coupled to a bus system 323. The bus system 323 shown in FIG. 3 may represent any one or more separate physical buses and/or point-to-point connections, connected by appropriate bridges, adapters and/or controllers. The bus system 323, therefore, may include, for example, a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 321 are the central processing units (CPUs) of the storage server 200 and, thus, control the overall operation of the storage server 200. In certain embodiments, the processor(s) 321 accomplish this by executing software, such as that described in more detail herein stored in memory 322. A processor 321 may include one or more programmable general-purpose or special-purpose microprocessors, digital signal processors (DSPs), programmable controllers, application specific integrated circuits (ASICs), programmable logic devices (PLDs), or the like, or a combination of such devices.

Memory 322 comprises storage locations that are addressable by the processor 321 and adapters for storing software program code and data structures associated with the present invention. The processor 321 and adapters may, in turn, comprise processing elements and/or logic circuitry configured to execute the software code and manipulate various data structures. Memory 322 can be a random access memory (RAM), a read-only memory (ROM), a flash memory, or the like, or a combination of such devices. Memory 322 stores, among other components, the storage operating system 324 of the storage server 200. It will be apparent to those skilled in the art that other processing and memory means, including various computer readable media, may be used for storing and executing program instructions pertaining to the invention described herein.

Also connected to the processor(s) 321 through the bus system 323 are a storage adapter 326 and a network adapter 327. The storage adapter 326 cooperates with the storage operating system 324 executing on the storage server 200 to access data from disks 250. The storage adapter 326 comprises a plurality of ports having input/output (I/O) interface circuitry that couples to the disks 250 (shown in FIG. 2) over an I/O interconnect arrangement, such as a conventional high-performance, fibre channel (FC) link topology.

The network adapter 327 comprises a plurality of ports adapted to couple the storage server 200 to one or more clients 210 (shown in FIG. 2) over point-to-point links, wide area networks, virtual private networks implemented over a public network (Internet) or a shared local area network. The network adapter 327 thus may comprise the mechanical, electrical and signaling circuitry needed to connect the node to the network.

2. Storage Operating System

Figure 4:
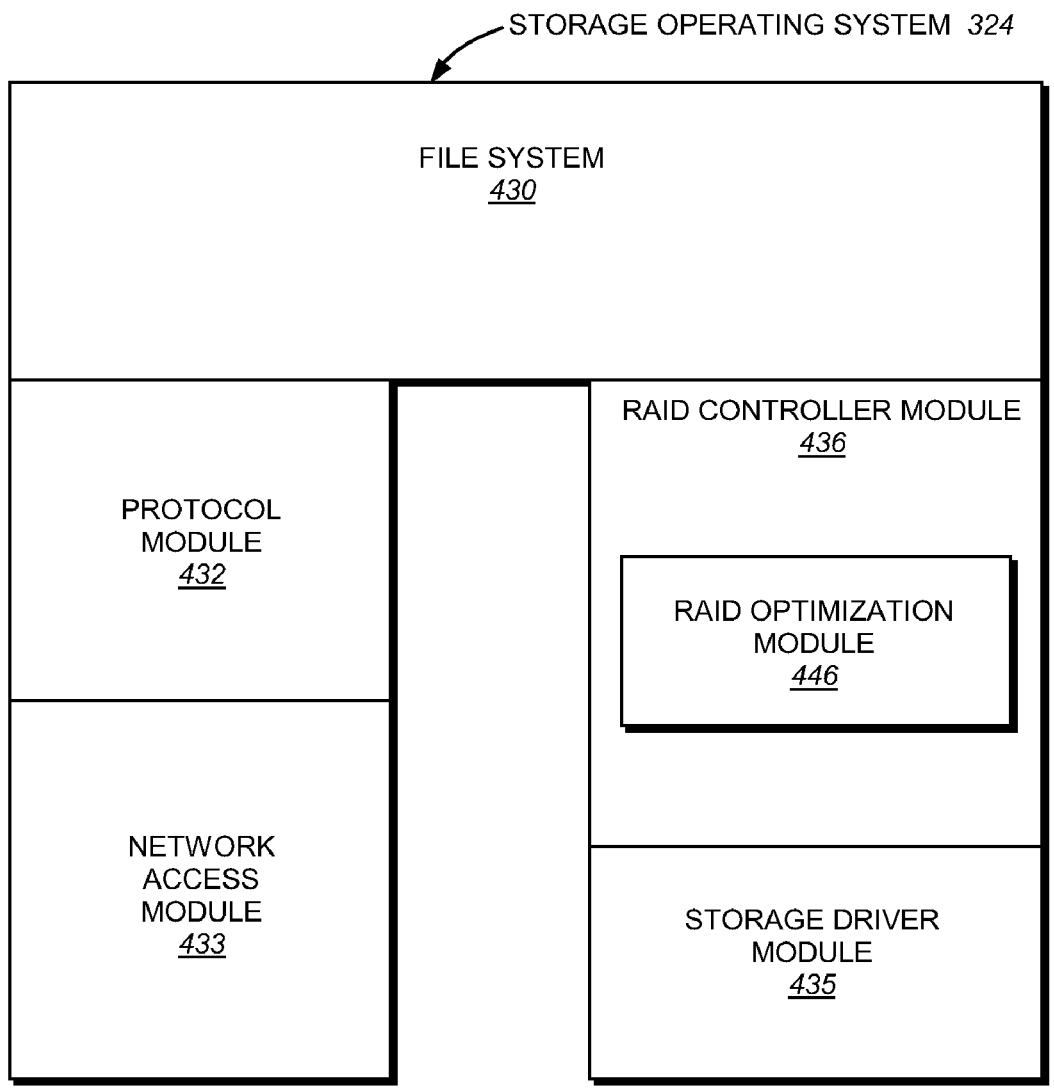
FIG. 4 is a diagram showing a storage operating system of the storage server of FIG. 2 according to an embodiment of the present invention.

FIG. 4 shows an example of the storage operating system 324 of the storage server 200. In the illustrative embodiment, the storage operating system 324 can be the NetApp® Data ONTAP® storage operating system available from Network Appliance Inc., of Sunnyvale, Calif., that implements a Write Anywhere File Layout (WAFL®) file system. However, it is expressly contemplated that any appropriate storage operating system may be employed for use in accordance with the inventive principles described herein. As used herein, the term "storage operating system" generally refers to the computer-executable code operable on a computer to perform a storage function that manages data access. The storage operating system 324 can also be implemented as a microkernel, an application program operating over a general-purpose operating system, such as UNIX® or Windows NT®, or as a general-purpose storage operating system with configurable functionality, which is configured for storage applications as described herein.

To facilitate access to the disks 250, the storage operating system 324 implements a file system 430. The file system 430 logically organizes the information as a hierarchical structure of named directories and files on the disks. In one embodiment, the file system 430 is a write-anywhere file system that "virtualizes" the storage space provided by the disks 250. Each file may be implemented as a set of data blocks configured to store information, such as data, whereas a directory may be implemented as a specially formatted file in which names and links to other files and directories are stored.

Storage operating system 324 further includes a protocol module 432, a network access module 433, a RAID controller module 436, and a storage driver module 435. The RAID controller module 436, in turn, executes a RAID optimization module 440 (also referred herein to as "optimization module"), the operations of which will be described in greater detail herein.

The protocol module 432 implements one or more of various high-level network protocols, such as Network File System (NFS), Common Internet File System (CIFS), Hypertext Transfer Protocol (HTTP) and/or Transmission Control Protocol/Internet Protocol (TCP/IP) to encode incoming client requests or encode outgoing responses to the client request in the appropriate protocol. The network access module 433 includes one or more drivers, which implement one or more lower-level protocols to communicate over the network, such as Ethernet. The protocol module 432 and the associated network access module 433 allow the storage server 200 to communicate over the communication system 230 (e.g., with clients 210).

Storage driver module 435 allows storage server 200 to communicate with the disk subsystem 240. The storage driver module 435 implements a lower-level storage device access protocol, such as Fibre Channel Protocol (FCP), Small Computer Systems Interface (SCSI) protocol, Serial ATA (SATA), or Serial Attached SCSI (SAS).

RAID controller module 436 (also referred to herein as a "storage module") manages storage devices, such as disks, in a RAID system. RAID controller module manages data storage and retrieval in response to access requests from clients 210, which may include requests to write data and/or to read data. In one embodiment, RAID controller module 436 can be a software module implemented on the storage server 200. In an alternative embodiment, RAID controller module 436 can be a separate enclosure implemented as hardware. RAID controller module 436 issues internal I/O commands to disks 250, in response to client requests. These commands can be a command to write data at a physical block number at disk 250 or a command to read data from a physical block number at disk 250.

RAID optimization module 440 is adapted to issue a command to a disk(s) 250 that stores parity for a stripe where one or more physical data blocks are modified. In one embodiment, the command is XPWrite command provided by SCSI standard, described in SCSI Block Commands, second generation, published draft of Sep. 22, 2006 from the T10 Technical Committee (see www.t10.org). XPWrite command includes a logical block address (LBA) of the block where to write data as well as a number of blocks for writing the data. Various steps executed by RAID optimization module 440 will be described herein in more detail with reference to FIGS. 7 and 9. Although the present invention is described in the context of XPWrite command, a person of ordinary skill in the art would understand that XPWrite command is one example of implementing the present invention.

Figure 5:
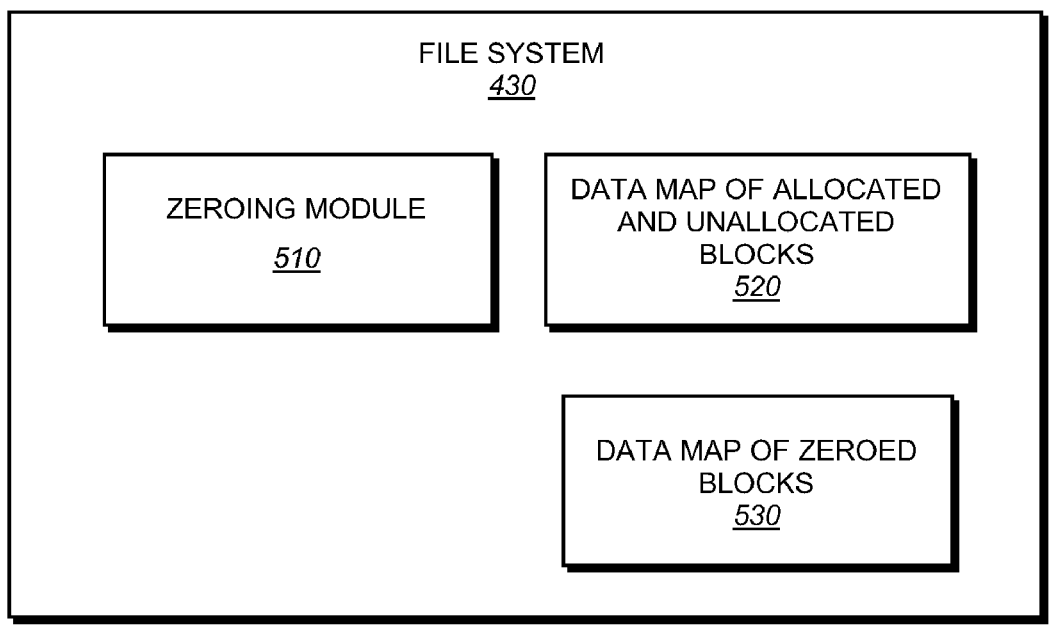
FIG. 5 is a block diagram of the components of a file system shown in FIG. 4.

Referring now to FIG. 5, it illustrates various components of the file system 430. File system 430 executes a zeroing module 510. Zeroing module 510 is adapted to issue a zeroing command to RAID controller module 436 to cause free physical data blocks on disk(s) 250 to assume a zero value. RAID controller module 436 receives the command and zeroes the free physical data blocks on disk(s) 250. Zeroing module 510 uses various data structures to identify which physical data blocks are free and which physical data blocks are allocated. In one implementation, file system 430 stores a data map 520 indicating which data blocks are allocated and a data map 530 indicating which data blocks contain a zero value. As used herein, data blocks that are currently occupied by any data or metadata are called "allocated data blocks." Data blocks that are not occupied by any data or metadata are called "free data blocks" or "unallocated data blocks." A person of ordinary skill in the art would understand that data map 530 and data map 520 can be implemented as one data structure.

Figure 6:
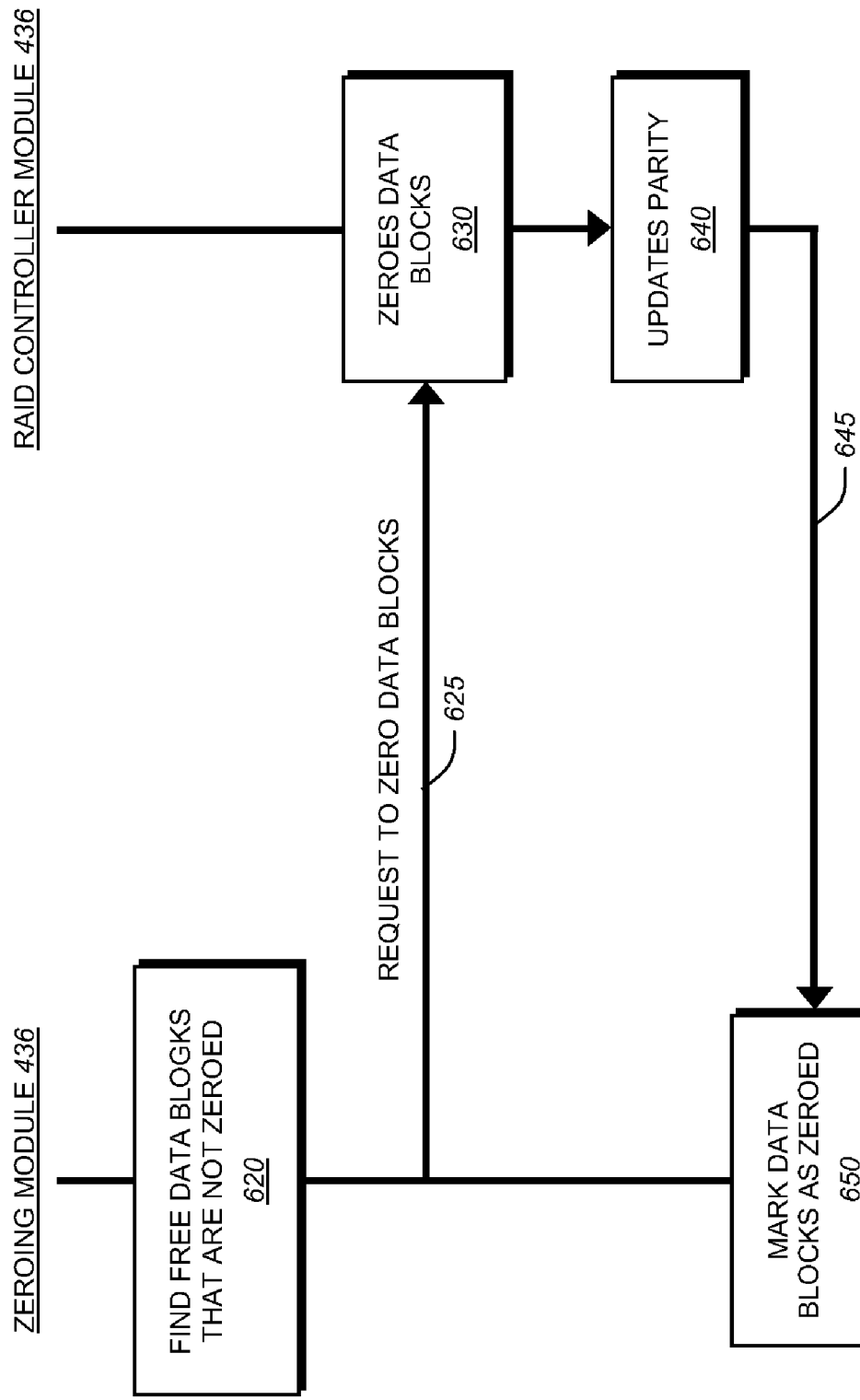
FIG. 6 is an event diagram of the steps performed by a zeroing module shown in FIG. 5 and a RAID controller module shown in FIG. 4 to zero data blocks on disks.

Referring now to FIG. 6, it illustrates operations performed by zeroing module 510 and RAID controller module 436 to zero free data blocks. In one embodiment, the process of zeroing data blocks is performed during idle time. As used herein, "idle time" refers to a period of time during which requests from clients 210 are expected to be low (such as, for example, during weekends, holidays, and off-peak hours). In another embodiment, the file system 430 may zero free blocks in a stripe at the same time that it is writing data to other data blocks in the same stripe.

At step 620, zeroing module 510 uses data maps 520 and 530 to identify free data blocks that are not zeroed. If zeroing module 510 finds free data blocks that have not been zeroed yet, zeroing module 510 sends a request 625 to RAID controller module 436 to zero free data blocks. RAID controller module 436, in turn, receives the request and zeroes 630 the free data blocks. At step 640, RAID controller module 436 updates parity for a stripe containing data blocks that are being zeroed. To this end, in one implementation, RAID controller module 436 reads data from the physical data blocks in a stripe that are being zeroed, reads the parity block of the stripe, and sends the data to processor 321 to perform XOR operation on the data and parity to compute the new parity. RAID controller module 436 writes the new parity to a parity block in a stripe where data blocks are zeroed and zeros the data blocks. RAID controller module 436 sends an acknowledgement 645 to zeroing module 510 upon completion of the zeroing process. At step 660, zeroing module 510 updates 650 data map 530 to indicate which free data blocks are zeroed.

Referring again to FIG. 2, command executing module 260 implemented in controller 280 on each disk 250 executes a command(s) issued by RAID optimization module 440. In one embodiment, module 440 issues XPWrite command to a disk that stores parity for a stripe in which one or more physical data blocks are modified. The command includes a block number at which new parity will be written and a number of blocks for writing the parity. In addition, the command includes an Operation Code (opcode) indicating the type of the command. Storage driver module 435 sends the command to the disk. Command executing module 260 at the disk that stores parity for a stripe where one or more physical data blocks are modified receives the command and reads, into disk memory 270, a parity block indicated in the command. Command executing module 260 identifies, from the opcode, the type of the command and requests data from storage driver module 435 to execute the command. In one implementation, storage driver 435 sends, to command executing module 260, the same data that are being written to a physical data block in the same stripe. Command executing module 260 receives the new data from the storage driver 435, XOR's the new data with the parity stored in disk memory 270, and writes the result of the XOR operation to the physical data block indicated in the XPWrite command.

In another embodiment, if the new data are being written to more than one physical disk, command executing module 260 receives at the disk, from storage driver module 435, a result of the XOR operation on the new data. Command executing module 260 XOR's the data it receives from storage driver module 435 with the parity stored in disk memory 270 and writes the result of the XOR operation to the physical data block on the disk that stores parity for a stripe where one or more physical data blocks are modified.

Since data blocks to which new data will be written have been zeroed, the necessity for reading these data blocks is eliminated. As a result of the execution of XPWrite command by module 260, the necessity for reading old parity by RAID controller module 436 is eliminated because command execution module 260 at the disks 250 reads old parity to compute new parity.

If data blocks on other drives not being written are zeroed, the necessity for reading those data blocks is eliminated. Since the new parity will be the result the XOR of the data blocks being written, then no read operations are required.

Examples of using RAID optimization technique according to various embodiments of the present invention are described below.

3. Examples of Using RAID Optimization Techniques in a Single Parity Protection Scheme To facilitate the following description in an exemplary embodiment, it is assumed that whenever a physical data block is modified, the new data are written to a new physical location on disk 250. This property is referred to herein as "write out-of-place".

A. Parity By Subtraction Write

Referring again to FIG. 1A, data sent to a storage server 200 for storage may be divided into fixed-size, e.g., four Kilo Byte, blocks (e.g., D0 through Dn), which are then stored in one or more stripes across multiple disks. Row parity, e.g. an exclusive-OR (XOR) of the data (e.g., D0 through Dn) in the stripe, is computed and stored in a protection block on disk D. The row parity for the first stripe, Stripe I, is a result of an XOR operation on D0, D1, and D2, which yields a value for row parity block P(0-2). Assume that storage server 200 received a request to modify D0. Storage server 200 decodes the request and passes the request to the file system 430. File system 430 identifies a logical block number at which the data will be written and sends a request to RAID controller module 436 to write the data at a particular disk (e.g., Disk A) at a logical block number. RAID controller module 436 uses Parity by Subtraction Write method to write new data into one data block, e.g., the data block that stores D0. To this end, RAID controller module 436 sends a read command to Disk A to read data from a data block that stores D0. Module 436 also sends a read command to Disk D to read data from a parity block that stores P(0-2).

Controller 280 at Disk A receives the first read command and executes the command as follows: it reads data block that stores D0 and transfers the data to module 436. Module 436, in turn, stores the data in memory 324.

Controller 280 at Disk D receives the second read command and executes the command as follows: it reads block that stores P(0-2) and transfers the data to module 436. Module 436, in turn, stores the data in memory 324.

Module 436 then XOR's D0, P(0-2), and new data.

Module 436 then issues a write command to Disk A to write new data at data block that stores D0. Storage driver module 435 puts the command into a SCSI request and sends the command to Disk A.

Controller 280 at Disk A receives the command and provides an indication to module 435 that it is ready to receive data. Upon receiving the data from module 435, controller 280 writes the data to replace D0.

Module 436 issues a write command to Disk D to write new parity to replace P(0-2). Storage driver module 435 puts the command into a SCSI request and sends the command to Disk D.

Controller 280 at Disk D receives the command and provides an indication to module 435 that it is ready to receive data. Upon receiving the data (i.e., the result of the XOR operation) from module 435, controller 280 writes the data the parity block for the stripe that stores D0.

Thus, to modify a data block in Stripe I, RAID controller module 436 would have to perform two read operations (one reads data from a data block that stores D0 and the other reads row parity from a parity block that stores P(0-2)).

According to an embodiment of the present invention, to modify one data block, e.g., the data block that stores D0, RAID controller module 436 issues a write command to Disk A to modify physical data block that stores D0. RAID optimization module 440 issues XPWrite command to a disk that stores parity (i.e., Disk D). The command includes a block number and a number of blocks. Storage driver module 435 sends the command to the disk that stores parity (i.e., Disk D).

Command executing module 260 at the disk that stores parity receives the command and reads, into disk memory 270, a parity block indicated in the command (i.e., P(0-2)). Command executing module 260 provides an indication to the storage driver module 435 that it is ready to receive data to execute XPWrite command. Storage driver 435 sends, to command executing module 260 at the disk that stores parity, the same data that is being sent to Disk A to modify D0. Command executing module 260 at the disk that stores parity receives the new data from the storage driver 435, XOR's the new data with the parity stored in disk memory 270, and writes the result of the XOR operation to the parity block at the disk that stores parity.

According to an embodiment of the present invention, since the physical data block that stores D0 has assumed a zero value and XOR'ing data with zero leaves the data unchanged, the need for reading, by RAID controller module 436, this data block is eliminated. Additionally, the need for reading, by RAID controller module 436, parity block that stores P(0-2) is eliminated because as a result of the execution of XPWrite command, module 260 reads parity block P(0-2) into disk memory 270 and performs XOR on the new data and contents of the parity block. Thus, zeroing data blocks to which new data are to be written eliminates some rotation latency because RAID controller module 436 does not need to read old data and to transfer the old data from disk(s) 250. In addition, old parity is not transferred to storage server 200 over communication links, such as FC links, since it is read by the module 260 at the disk that stores parity.

B. Parity By Recalculation Write

Assume that Parity by Recalculation Write method is being used to write new data to more than one data block, e.g., the data blocks that store D0 and D1. Using conventional mechanism, to write new data using Parity by Recalculation Write, the following steps may be performed by RAID controller module 436:

Read data from the data blocks, e.g. D2, other than the ones to which new data are written (D0, D1);

Compute new row parity by performing XOR of (D2 and new data);

Write new data;

Write new row parity to parity block.

Thus, to write new data to more than one physical disk, file system 430 would have to perform at least one read operation.

According to an embodiment of the present invention, if the data blocks where the new data are written are zeroed, RAID controller module 436 updates row parity to reflect that row parity P (0-2) is a result of XOR of new data to be written XORed with parity. Thus, row parity before new data is written is D2 since D0 and D1 store a zero value and XOR of (0, 0, and D2) is D2. To perform a write operation according to an embodiment of the present invention, the following steps may be performed. RAID controller module 436 XOR's new data prior to writing new data to replace D0 and D1. RAID optimization module 440 issues XPWrite command to a disk that stores parity for a stripe where one or more physical data blocks are modified (Disk D). Storage driver module 435 sends the command to Disk D. Command executing module 260 at disk D receives the command and reads, into disk memory 270, a parity block indicated in the command. Command executing module 260 provides an indication to the storage driver module 435 that it is ready to receive data to execute XPWrite command.

Storage driver module 435 sends the result of the XOR operation to module 260. Command executing module 260 XOR's the data it receives from storage driver module 435 with the parity stored in disk memory 270. Module 260 writes the result of the XOR operation to the physical data block indicated in the XPWrite command.

Figure 7:
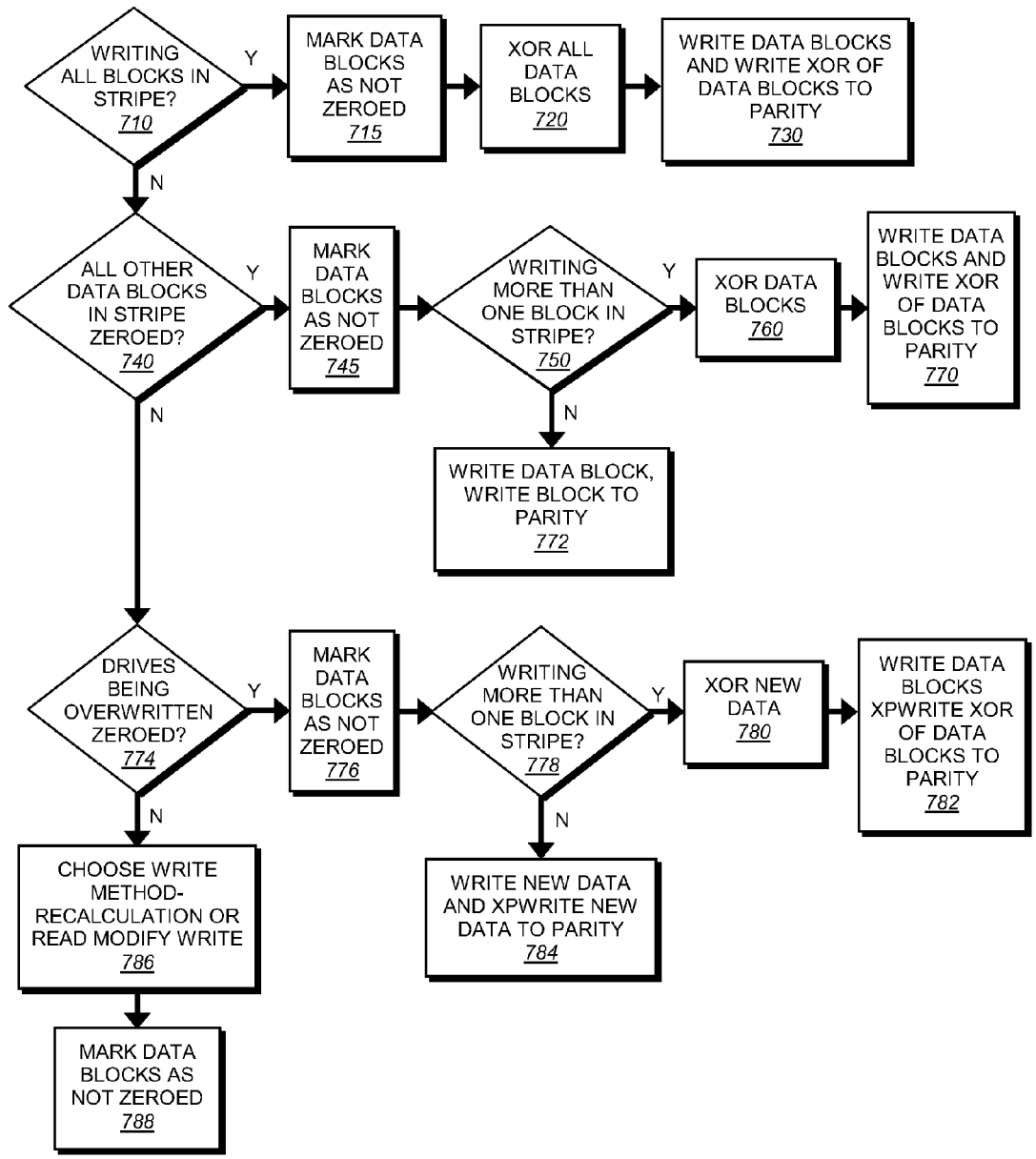
FIG. 7 is a flow diagram of a method for performing a write operation in a single parity RAID system according to an embodiment of the present invention.

FIG. 7 is a flow diagram of operations executed by RAID controller module 436 and RAID optimization module 440 to perform Parity by Subtraction Write and Parity by Recalculation Write in a single parity protection scheme according to an embodiment of the present invention.

At step 710, module 440 determines whether data are written to all data blocks in a stripe. Responsive to a positive determination at step 710, module 436 marks 715 data blocks as not zeroed in data map 530 and computes parity using conventional methods. For example, module 436 XORs 720 new data to compute row parity. At step 730, module 436 writes new data to the physical data blocks and writes a result of the XOR operation to a row parity block.

If, alternatively, at step 710 data is not written to all data blocks in a stripe, module 436 determines at step 740 whether all other data blocks in a stripe store a zero value (or are zeroed). Responsive to a positive determination at step 740, module 436 uses data map 530 to mark 745 the data blocks that are being written as not zeroed. Module 436 determines at step 750 whether data are written to more than one data block in a stripe. If the data are written to more than one data block in a stripe, RAID controller module 436 XOR's 760 new data. Module 436 writes 770 new data to physical data blocks and writes the result of the XOR operation to a parity block.

If, alternatively, at step 750 new data are written to one data block, module 436 writes 772 new data to physical data blocks and writes new data to a row parity block since the row parity is the same as the new data.

If at step 774 data blocks to be overwritten store a zero value, module 436 uses data map 530 to mark 776 the data blocks that are being written as not being zeroed. At step 778, module 436 determines whether new data are written to more than one data block in a stripe. Responsive to a positive determination, e.g., data are written to more than one data block, module 436 computes parity of new data by performing 780 an XOR operation on all new data. Module 436 then writes 782 new data to data blocks indicated in the write command.

Module 440 then issues XPWrite command to a disk that stores parity for a stripe where one or more physical data blocks are modified. Module 260 at the disk receives the command and executes the command as follows. Module 260 reads row parity into disk memory 270 (which is a result of XOR of data blocks not being written). Module 260 receives, from storage driver module 435, a result of the XOR operation on new data. Module 260 XOR's the result of the XOR operation and the row parity. Module 260 writes the result of the XOR operation to a row parity block. As a result, by zeroing data blocks to which data will be written, an embodiment of the present invention eliminates the requirement of a conventional method Parity by Recalculation Write to read old data stored in the data blocks other than the ones to which new data are written. Executing XPWrite command eliminates the need for reading old row parity.

If, alternatively, only one data block is written in a stripe, module 436 writes 784 new data to a physical data block. Module 440 then issues XPWrite command to a disk that stores parity for a stripe where a physical data block is modified. Module 260 at the disk 250 receives the command and executes the command as follows. Module 260 reads old parity into disk memory 270. Module 260 receives, from the storage driver module 435, data to be written to a physical data block (the same data that was sent to a physical data block to be modified). Module 260 XOR's the data and the old parity and writes the result of the XOR operation to the parity block at the parity disk. As a result, an embodiment of the present invention eliminates the requirement of the conventional method Parity by Subtraction Write for reading old parity by RAID controller module 436 at storage server 200 and transferring the parity over communication channels, such as FC links.

If at step 774 none of the data blocks in a stripe store a zero value and data are written to only one data block, conventional methods, e.g., Parity by Subtraction Write or Parity by Recalculation Write 786, can be used to perform a write operation. At step 788, module 436 uses data map 530 to mark 776 the data blocks that are being written as not being zeroed. As was previously described, according to the Parity by Subtraction Write, old parity block is read. A data block where the new data is to be written is also read. Then an exclusive OR (XOR) operation is performed on the old parity and old data. The result is XOR'ed with the new data to arrive at a new parity. The new data are written to the data block and the new parity is written to the parity block. According to the Parity by Recalculation Write, to compute row parity, data blocks of the stripe other than the ones to which data are written are read and XOR'ed with the new data. New data are written to data blocks. The computed parity is written to the parity block.

4. Examples of Using RAID Optimization Techniques in a Dual Parity Protection Scheme RAID optimization technique of the present invention is applicable to a dual parity protection scheme. Dual parity protection scheme is described in U.S. Pat. No. 6,993,701, entitled "ROW-DIAGONAL PARITY TECHNIQUE FOR ENABLING EFFICIENT RECOVERY FROM DOUBLE FAILURES IN A STORAGE ARRAY", by Peter F. Corbett, et al, the disclosure of which is incorporated herein by reference in its entirety.

By way of background, disk subsystem 240 may include n storage devices (such as disks), where n=p+1 and p is a prime number. The storage devices are divided into blocks. Within each device, n−2 blocks are arbitrarily selected and grouped to form a stripe across all the devices. Within the stripe, one device is designated to hold parity formed by selecting blocks from the other devices as input. This device is called a diagonal parity device and the parity it holds is called diagonal parity. Within each stripe, one block is selected from each of the devices that are not the diagonal parity device in that stripe. This set of blocks is called a row. The formulation of rows is continued until all blocks in the stripe that are not in the diagonal parity device are assigned to exactly one row. There are a total of n−2 rows. Within each stripe, one block is selected from each of all but one of the devices that are not the diagonal parity device in that stripe, with the further restriction that no two of the selected blocks belong to the same row. This is called a diagonal parity set or a "diagonal". A diagonal may be formed, for example, by numbering the data, row parity, and diagonal parity devices from 0 to n−1, numbering the rows from 0 to n−3, and then assigning the block at device i, row j to diagonal (i+j+1) mod(n−1). The formation of diagonals continues until all blocks that are not on the diagonal parity device in the stripe are assigned to diagonals, with the further restriction that no two diagonals exclude all blocks from the same device. There are n−1 diagonals. Of the n−1 diagonals, n−2 diagonals are selected. The blocks in those diagonals, whether they hold data or parity, are combined to form a diagonal parity block. The n−2 diagonal parity blocks are stored in arbitrary order in the n−2 blocks in the stripe that reside on the device that holds diagonal parity in that stripe.

Referring now to FIG. 8, exemplary diagonal parity sets are illustrated in an array 800 according to RAID-DP. In the example in FIG. 8, one stripe is shown that includes rows 1 through 4. Data is stored on Disk 1 through Disk 4. Disk 0 stores row parity for each row. Disk 5 stores diagonal parity for each diagonal. Each data block in a stripe is identified by a row and a disk number. The number in each data block indicates the diagonal parity set the data block belongs to. In the example shown in FIG. 8, row parity is computed as follows:

Row parity for row 1 is a result of XOR operation on data stored in {Row 1, Disk 1}, {Row 1, Disk 2}, {Row 1, Disk 3}, and {Row 1, Disk 4}.

Row parity for row 2 is a result of XOR operation on data stored in {Row 2, Disk 1}, {Row 2, Disk 2}, {Row 2, Disk 3}, and {Row 2, Disk 4}.

Row parity for row 3 is a result of XOR operation on data stored in {Row 3, Disk 1}, {Row 3, Disk 2}, {Row 3, Disk 3}, and {Row 3, Disk 4}.

Row parity for row 4 is a result of XOR operation on data stored in {Row 4, Disk 1}, {Row 4, Disk 2}, {Row 4, Disk 3}, and {Row 4, Disk 4}.

Diagonal parity is stored for p−1 diagonal parity sets, where p is a prime number greater than 2. Therefore, diagonal parity is not stored for diagonal parity set 4. The diagonal parity set for which diagonal parity is not stored is referred to as the "missing" diagonal. Diagonal parity for a diagonal parity set is computed as an exclusive-OR (XOR) of data stored in data blocks and the row parity block that make up the diagonal parity set.

Diagonal parity set 0 includes data on data blocks {Row 1, Disk 0}, {Row 4, Disk 2}, {Row 3, Disk 3}, and {Row 2, Disk 4}. Diagonal parity for diagonal parity set 0 is computed by XOR'ing data stored in these data blocks. Diagonal parity for set 0 is stored in data block {Row 1, Disk 5}.

Diagonal parity set 1 includes data on data blocks {Row 1, Disk 1}, {Row 2, Disk 0}, {Row 4, Disk 3}, and {Row 3, Disk 4}. Diagonal parity for set 1 is computed by XOR'ing data stored in these data blocks. The computed diagonal parity for set 1 is stored in data block {Row 2, Disk 5}.

Diagonal parity set 2 includes data on data blocks {Row 3, Disk 0}, {Row 2, Disk 1}, {Row 1, Disk 2}, and {Row 4, Disk 4}. Diagonal parity for set 2 is computed by XOR'ing data in these data blocks. The computed diagonal parity for set 2 is stored in data block {Row 3, Disk 5}.

Diagonal parity set 3 includes data on data blocks {Row 4, Disk 0}, {Row 3, Disk 1}, {Row 2, Disk 2}, and {Row 1, Disk 3}. Diagonal parity for set 3 is computed by XOR'ing data stored in these data blocks. The computed diagonal parity for set 3 is stored in data block {Row 4, Disk 5}.

Diagonal parity set 4 includes data on data blocks {Row 4, Disk 1}, {Row 3, Disk 2}, {Row 2, Disk 3}, and {Row 1, Disk 4}. Diagonal parity set 4 is the missing diagonal for which diagonal parity is not stored.

Assume that Disk 1 stores zero values and new data are written to Disk 1 using Parity by Subtraction method. According to the conventional method, the following steps would have to be performed by RAID controller module 436:

Read Data on Disk 1;
Read Row Parity;
Read Diagonal Parity;
Compute new row parity by performing an XOR operation of data stored in Disk 0, row parity, and new data;
Compute new diagonal parity by performing an XOR operation of data stored in D0, diagonal parity, and new data;
Write new data to Disk 1;
Write new row parity to Disk 0; and
Write new diagonal parity to Disk 5.

Thus, to perform a write operation, RAID controller module 436 would have to perform three read operations.

According to an embodiment of the present invention, if a data block(s) where new data are written stores a zero value, there is no need to read old data, row parity, or diagonal parity. To perform a write operation according to an embodiment of the present invention, RAID optimization module 440 performs the steps outlined below. It should be noted that memory 322 on the storage server 200 includes a memory block for storing row parity and a memory block for storing a diagonal parity.

If the data block(s) which are being overwritten contain all zeroes, then:
1. Copy first data block to be written into a memory block for row parity;
2. Copy first data block to be written into a memory block for diagonal parity;
3. Compute row parity based on new data;
4. Compute diagonal parity based on new data;
5. Write data to physical data blocks;
6. XPWrite a result of step 3 to row parity disk;
7. XPWrite a result of step 4 to diagonal parity disk;

Below is an algorithm outlining steps for computing diagonal parity based on new data and identifying which data blocks to use to compute the diagonal parity:

p=prime number
Number of diagonal parity sets=p−1
Number of disks=p+1
i=disk number 0 . . . n
k=diagonal parity set 0 . . . m
For (k=0; k<number diagonal sets; k++)
{
get offset of diagonal stripe block, wherein offset indicates an address where a block begins from the beginning of a memory;
(disk number+k) % p=offset, wherein % is a modulo (a remainder of division (disk number+k) and p).
if (offset==(p−1))
  then skip
else
XOR diagonal stripe block into offset of data stored in a memory block for diagonal parity
}
If writing more than one disk
{
For (x=1; x<number of disks being written; x++)
{
XOR data block to be written into a memory block for row parity
For (k=0; k<num diagonal sets; k++)
{
get offset of diagonal stripe block
(disk number+k) % p=offset
if (offset==(p−1))
  then skip else
   XOR diagonal stripe block into offset of diagonal parity memory
   {
   }
   XOR result stored in a memory block for row parity into memory for diagonal parity
   {

As a result of the execution of XPWrite command sent to a row parity disk (as stated above in step 6), module 260 at the row parity disk (e.g., disk 0 in FIG. 8) reads, into disk memory 270, old row parity at the block number indicated in the command, receives, from storage driver module 435, row parity computed based on new data, XOR's the computed row parity for new data with old row parity, and writes the result of the XOR operation to the row parity disk.

As a result of the execution of XPWrite sent to a diagonal parity disk (as stated above in step 7), module 260 at the disk storing diagonal parity (e.g. disk 5 in FIG. 8) reads, into disk memory 270, old diagonal parity at the block number indicated in the command, receives, from storage driver module 435, diagonal parity computed based on new data, XOR's the computed diagonal parity for new data with the old diagonal parity, and writes the result of the XOR operation to the diagonal parity disk. Below is provided an example that demonstrates application of this algorithm.

Referring again to FIG. 8, assuming all disks are zeroed and new data {2, 3, 4, 5} is being written to Disk 2.

First, new data is copied to a block of memory 322 for row parity. The block of memory 322 for row parity now stores {2, 3, 4, 5}. Since data stored in Disks 1 through 4 is zeroed, row parity is the same as new data.

Next, new data is copied to a block of memory 322 for diagonal parity. The block of memory 322 for diagonal parity now stores {2, 3, 4, 5}. Diagonal parity is computed for each diagonal parity set as follows:

1. For each diagonal stripe block in disk 2, XOR the diagonal stripe block into diagonal parity;

2. Find the diagonal stripe block number for the first block in disk 2: (2+0) % 5=2. XOR the first block into the diagonal parity at the appropriate offset for diagonal stripe block 2. (2 XOR 4=6)

3. Find the diagonal stripe block number for the second block in disk 2: (2+1) % 5=3.

XOR the second stripe block into the block of memory 322 for diagonal parity at the appropriate offset for diagonal stripe block 3. (3 XOR 5=6).

4. Find the diagonal stripe block number for the third block in disk 2: (2+2) % 5=4. Diagonal stripe block 4 is not in diagonal parity. Therefore it is a missing diagonal and is being skipped for purposes of storing diagonal parity.

5. Find the diagonal stripe block number for the fourth block in disk 2: (2+3) % 5=0.

XOR the fourth stripe block into the memory 322 for diagonal parity at the appropriate offset for diagonal stripe block 0. (5 XOR 2=7).

Referring now to Table 1, it illustrates computed row parity and diagonal parity for the provided example.

TABLE 1

Disk Array That Stores Computed Row and Diagonal Parity When New Data is Written to Disk 2 and Disks 1, Disk 3, and Disk 4 are zeroed.

| Disk 0 Row Parity | Disk 1 | Disk 2 | Disk 3 | Disk 4 | Disk 5 Diagonal Parity |
|---|---|---|---|---|---|
| 2 | 0 | 2 | 0 | 0 | 7 |
| 3 | 0 | 3 | 0 | 0 | 3 |
| 4 | 0 | 4 | 0 | 0 | 6 |
| 5 | 0 | 5 | 0 | 0 | 6 |

As shown in Table 1, Disk 2 stores {2,3,4,5}, Disk 0 stores {2,3,4,5}. Disk 5 stores diagonal parity computed using the algorithm described above.

Figure 9:
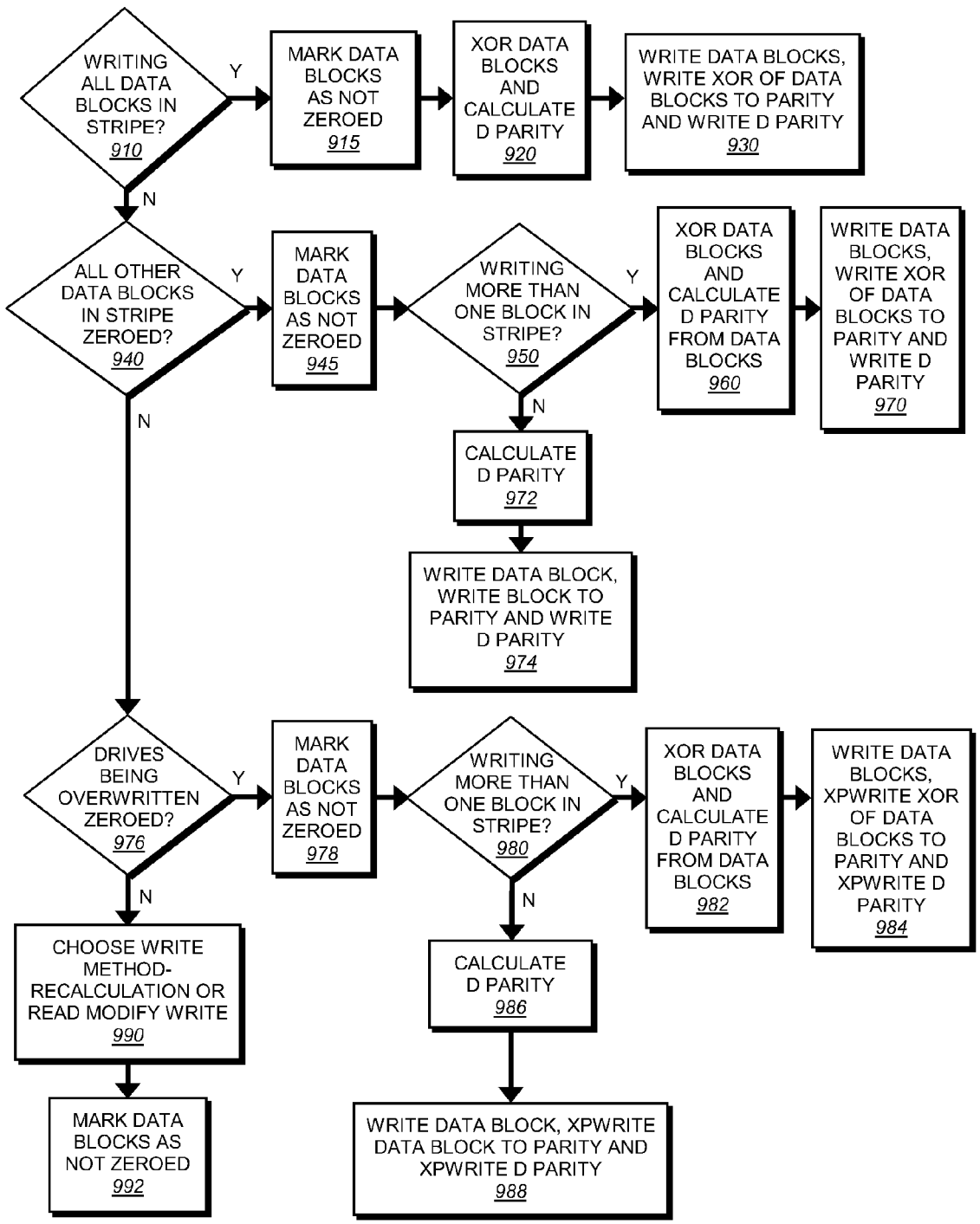
FIG. 9 is a flow diagram of a method for performing a write operation in a dual parity RAID system according to an embodiment of the present invention.

FIG. 9 is a flow diagram of operations performed by RAID optimization module 440 and RAID controller module 436 to perform Parity by Subtraction Write and Parity by Recalculation Write in RAID-DP according to an embodiment of the present invention.

At step 910, module 436 determines whether data are written to all data blocks in a stripe. Responsive to a positive determination at step 910, module 436 uses data map 530 to mark 915 the data blocks that are being written as not being zeroed. At step 920, module 436 XORs new data to compute row parity. Module 436 also computes diagonal parity using the algorithm for computing diagonal parity as provided herein. At step 930, module 436 writes new data to physical data blocks, writes a result of the XOR operation to a row parity block, and writes diagonal parity to a diagonal parity block.

If, alternatively, data is not being written to all data blocks in a stripe, module 436 determines at step 940 whether all other data blocks in a stripe store a zero value. Responsive to a positive determination at step 940, module 436 marks 945 the data blocks that are being written as not being zeroed, using data map 530. At step 950, module 436 determines whether data is to be written to more than one data block in a stripe. If the data are written to more than one data block in a stripe, module 436 computes row parity by performing XOR operation 960 on the new data. Module 436 further computes a diagonal parity. Module 436 then writes 970 new data to physical data blocks on disk(s) 250, writes a result of the XOR operation to a row parity block, and writes diagonal parity to a diagonal parity block.

If, alternatively, at step 950 new data are written to one data block, module 436 computes diagonal parity using the algorithm for computing diagonal parity as provided herein. At step 974, new data are written to a data block, new data is written to a row parity block, and a diagonal parity is written into a diagonal parity block.

At step 976, module 436 determines whether data blocks being overwritten are zeroed. Responsive to a positive determination at step 976, module 436 marks 978 the data blocks that are being written as not being zeroed, using data map 530. Module 436 determines at step 980 whether new data are written to more than one data block in a stripe. If more than one data block is written, module 436 computes 982 row parity by XOR'ing data to be written to physical data blocks. Module 436 also computes diagonal parity using an algorithm for computing diagonal parity as provided herein.

At step 984, module 436 writes new data to physical data blocks. At step 984, module 440 issues a command to a disk that stores row parity for a stripe where one or more physical data blocks are modified. In one exemplary embodiment, the command is XPWrite command. Module 260 at the disk that stores row parity receives the command and executes the command as follows. Module 260 reads, into disk memory 270, old row parity at the block number indicated in the command. Module 260 receives, from storage driver module 435, the result of XOR operation on data to be written to physical data blocks. Module 260 XOR's the result of the XOR operation with the old row parity and writes the result to the row parity block indicated in the command at the disk that stores row parity.

Module 440 also issues a second XPWrite command to a disk that stores diagonal parity (a diagonal parity disk). Module 260 at disk 250 executes the command as follows. Module 260 reads, into disk memory 270, old diagonal parity at the block number indicated in the command. Module 260 receives, from storage driver module 435, diagonal parity computed based on new data. Module 260 XOR's the computed diagonal parity for new data with the old diagonal parity and writes the result of the XOR operation to the diagonal parity block at the disk that stores diagonal parity.

If, alternatively, only one data block is written in a stripe, module 436 computes 986 diagonal parity using the algorithm for computing diagonal parity as described herein. At step 988, module 436 writes new data into physical data blocks. Module 440 issues one XPWrite command to a disk that stores row parity for a stripe where a physical data block is modified and another XPWrite command to a disk that stores diagonal parity for a diagonal set in which a physical data block is modified. Module 260 receives the commands and executes the commands as described herein.

If none of the data blocks in a stripe store a zero value, module 436 uses 990 conventional methods, e.g., Parity by Subtraction Write and Parity by Recalculation Write, to compute new row parity and diagonal parity and perform a write operation. At step 992, module 436 marks the data blocks that are being written as not being zeroed, using data map 530. As was previously described, according to the Parity by Subtraction Write method, an old row parity block, an old diagonal parity block, and a data block where new data are written are read. Old row parity, old data, and new data are XOR'ed to compute new row parity. Old data, old row parity, old diagonal parity and new data are XOR'ed to compute new diagonal parity. The new data are written to the data block and the new row parity and new diagonal parity are written to respective parity blocks.

According to Parity by Recalculation Write, data is read from data blocks to which data is not written. Row parity is computed as an XOR operation on new data and data read from the data blocks to which new data is not written. Similarly, diagonal parity is computed as an XOR operation on new data and data read from the data blocks to which new data is not written. The new data are written to data blocks; row parity is written to row parity block; and diagonal parity is written to a diagonal parity block.

5. Degraded Mode Write

Thus far, the operation of the storage server 200 has been described in the context of normal operations, e.g., when I/O access requests from clients 210 are serviced by storage server 200 and data can be read and written to/from disks 250. In a situation when one or more disks fail, storage server 200 operates in a degraded mode. That is, data cannot be read or written to all the disks. When new data are to be written to a failed disk, parity is calculated to include new data although the data itself are not written to the disk. To this end, RAID controller module 436 reads data from all other data disks in an array in a stripe, XOR's the data that are being read with new data to compute parity, and updates the parity block with the new parity in the stripe. The example below illustrates operation of storage server 200 in a degraded mode.

Referring again to FIG. 1A, assume that Disk A failed and new data are written to block D0 in Disk A. Using the Parity by Recalculation Write method, the following steps would have to be performed by RAID controller module 436 to write data:

Read data in Stripe 0 from disks (Disk B and Disk C) other than the ones to which data is written (Disk A);

Compute new row parity for Stripe 0 by XOR'ing data on Disk B, data on Disk C and new data;

Write new row parity to row parity block P(0-2);

According to an embodiment of the present invention, if Disk A has been zeroed as part of the zeroing process, row parity for Stripe 0 is a result of XOR of data stored on Disk B and Disk C. Since Disk A stores a zero value, row parity is a result of XOR of data stored on Disk B and Disk C. According to an embodiment of the present invention, to avoid performing selected read operations, such as reading data from Disk B and Disk C, module 440 issues XPWrite command to a disk that stores parity for a stripe in which a physical data block is modified, i.e., Disk D.

Module 260 at Disk D receives the command from server system 200 and executes the command as follows. It reads row parity (i.e., the result of XOR of data stored on Disk B and Disk C) into disk memory 270; it receives, from storage driver module 435, new data for Disk A, it XOR's row parity and new data, and writes the result of the XOR to Disk D at the block indicated in the command.

Thus, although Disk A failed and new data cannot be written to Disk A, row parity for a stripe where new data would have to be written if not for a disk failure, is computed to include new data. According to an embodiment of the present invention, zeroing free data blocks eliminates the requirement for reading data from these data blocks as well from the data blocks other than the ones to which new data will be written.

6. Media Error

A media error on a disk occurs when data cannot be read from a particular block or a number of blocks from that disk. Referring now to Table 2, it illustrates an array of disks storing physical data blocks. In this example, one stripe (Stripe 0) is shown. Data is stored on Disk 1 through Disk 4. Disk 0 stores row parity.

TABLE 2

| Disk Array | | | | |
|---|---|---|---|---|
| Disk 0 Row Parity | Disk 1 | Disk 2 | Disk 3 | Disk 4 |
| 9 | 0 | 2 | 3 | 4 |

Assume that Disk 1 failed and Disk 2 has a media error. In general, to recover data from a data block on Disk 2 that has a media error, RAID controller module 436 would have to perform the following steps:

Read data stored on Disk 1, Disk 3, and Disk 4 for Stripe 0;

Read row parity from Disk 0 for Stripe 0;

XOR data stored on Disk 1, Disk 3, and Disk 4 for Stripe 0;

XOR the result of the previous step and row parity for Stripe 0.

However, since Disk 1 failed and data stored on Disk 1 cannot be provided to recover data stored on Disk 2, data stored on a physical data block that has a media error on Disk 2 could not be recovered. According to an embodiment of the present invention, if Disk 1 stores a zero value, to recover data from physical data block in Stripe 0 on Disk 2, RAID controller module 436 may perform the following steps:

Read data on Disk 3 and Disk 4 for Stripe 0;
Read row parity for Stripe 0;
XORs data on Disk 3 and Disk 4 for Stripe 0;
XORs the result of the previous step and row parity for Stripe 0.

If Disk 1 stores zero, then XOR'ing data stored on Disk 1, Disk 3 and Disk 4 yields the same result as XOR'ing data stored on Disk 3 and Disk 4, thereby eliminating the need for reading data on Disk 1 Thus, knowing that one of the disks stores a zero value in a stripe allows file system 430 to recover data from a disk that has a media error when there is a disk failure in RAID-4 and RAID-5.

Also, in a dual parity RAID array with two failed drives and a media error on a third disk, the data on from the drive with a media error is recoverable if the corresponding block on either failed drive was a zeroed block. This data would otherwise be unrecoverable.

7. Optimization Using Write-in-Place (WIPL)

The above embodiments have been discussed in the context of file system 430 writing modified data to a disk "out of place", e.g., the new data are written to a new physical location on the disk. According to another embodiment of the present invention, file system 430 may utilize a "write-in-place" (WIPL) mechanism to write data. In WIPL, in response to a request to write new data, file system 430 sends a command to RAID controller module 436 to write the data to a disk. In response, RAID controller module 436 reads old data from the disk into a memory 324 and writes the old data somewhere on the disk to provide a snapshot capability. File system 430 provides a pointer to an address in memory 324 where the old data is stored so that it could be accessed at any time.

Still referring to Table 2, new data are written to Disk 1. To accomplish a write operation in WIPL using a conventional technique, the following steps are performed by RAID controller module 436:

Read data from the data block where new data to be written (e.g., data stored on Disk 1);
Read row parity;
Compute new row parity by XOR'ing data stored on Disk 1, row parity, and new data;
Write new data to Disk 1; and
Write new row parity to row parity disk.

According to an embodiment of the present invention, since data from Disk 1 has already been read into memory 324 when a copy of the data was taken, and a pointer to memory location of the copy of the data was provided, there is no need to read that data again. Thus, to complete a write request in WIPL, the following steps may be performed:

Module 436 XOR's new data with old data that is stored in memory 324.
Module 436 writes new data to Disk 1.
Module 440 issues XPWrite command to a disk that stores parity for a stripe where a physical data blocks is modified (i.e., Disk 0).

As a result of executing XPWrite command, module 260 at Disk 0 performs the following steps:

Module 260 reads old parity into disk memory 270.
Module 260 receives, from storage driver module 435 the result of XOR of old data and new data.
Module 260 XOR's the result of the XOR in the previous step with old parity.
Module 260 then writes the result of the XOR to a parity block indicated in the command, at Disk 0.

Thus, since old data has already been copied into memory 324 and a pointer is provided to a memory location where the old data is stored, this embodiment of the present invention eliminates the need for reading, by RAID controller module 436, old data to compute new parity. Rather, RAID optimization module 440 sends a command to a parity disk.

Thus, embodiments of the present invention eliminate selected read operations to modify physical data blocks. This is accomplished by zeroing free data blocks, providing a pointer to old data, and by leveraging the capabilities of XPWrite command sent to a disk that stores parity. This eliminates some rotation latency and increases system performance. The present invention can be implemented in RAID-4, RAID-5, RAID-6, and RAID-DP data protection schemes.

It will be appreciated that the following variations and examples are not intended to be exhaustive or to limit the invention. These variations and examples intend to provide further understanding of embodiments of the present invention.

Although the present invention for purpose of explanation has been described with reference to specific exemplary embodiments, it will be understood that the invention is not limited to the embodiments described. A person of ordinary skill in the art would understand that the present invention can be practiced with modifications and alternations to those embodiments or can be practiced in other embodiments within the spirit and scope of the appended claims.

Moreover, non-dependent acts may be performed in parallel. The embodiments were chosen and described in order to best explain the principles of the invention and its practical applications, to thereby enable others skilled in the art to best utilize the invention and various embodiments with various modifications as are suited to the particular use contemplated.

Furthermore, the use of the phrase "one embodiment" throughout does not necessarily mean the same embodiment. Although these particular embodiments of the invention have been described, the invention should not be limited to these particular embodiments. Accordingly, the specification and drawings are to be regarded in an illustrative sense rather than a restrictive sense.

Unless specifically stated otherwise, it is to be appreciated that throughout the discussions utilizing terms such as "processing" or "computing" or "calculating" or "determining" or "displaying" or the like refer to the action and processes of a computer system or similar electronic computing device that manipulates and transforms data represented as physical (e.g. electronic) quantities within the computer systems registers and memories into other data similarly represented as physical quantities within the computer system.

The present invention can be implemented by an apparatus for performing the operations herein. This apparatus may be specially constructed for the required purposes or it may comprise a machine, such as a general purpose computer selectively activated or reconfigured by a computer program (such as a collection of instructions for execution by a machine or processor for example) stored in the computer. Such a computer program may be stored in a computer readable storage medium, such as, but not limited to any type of disk including floppy disks, optical disks, magnetic optical disks, read-only memories, random access memories, EPROMS, EEPROMS, magnetic or optical cards or any type of media suitable for storing physical (e.g. electronic) constructions and each coupled to a computer system bus. Each of these media may be coupled to a computer system bus through use of an appropriate device for reading and or for writing the media.

What is claimed is:

1. A method for operating a storage system comprising a processor and a memory, the method comprising:
   issuing a zeroing command to cause free storage locations at a plurality of storage devices, associated with the storage system, to assume the zero value;
   executing the zeroing command by causing the free storage locations identified by the command to assume the zero value;
   receiving a write operation directed to one or more selected storage locations; and
   in response to receiving the write operation directed to the one or more selected storage locations, computing new parity for the storage system that contains zeroed storage locations without reading parity associated with the one or more selected storage locations prior to writing data associated with the write operation directed to the one or more selected storage locations.

2. The method of claim 1, wherein computing the new parity further comprises computing the new parity for a stripe of the storage system by performing an exclusive OR (XOR) operation with the data associated with the write operation directed to the one or more selected storage locations of the stripe.

3. The method of claim 1, wherein the new parity is computed without reading the zeroed storage locations.

4. The method of claim 1, wherein the free storage locations do not store data.

5. The method of claim 1, wherein the new parity is row parity.

6. The method of claim 1, wherein the new parity is diagonal parity.

7. A parity protection system, comprising:
   a zeroing module configured to initiate a zeroing process on a plurality of storage devices in the parity protection system by issuing a zeroing command to cause free storage locations at the plurality of storage devices to assume a zero value, wherein the parity protection system comprises a processor and a memory; and
   a storage module coupled to the zeroing module and configured to execute the zeroing command to cause the free storage locations identified by the command to assume the zero value, wherein the storage module, in response to receiving a write operation directed to one or more selected storage locations, is further configured to compute new parity for the parity protection system that contains the zeroed storage locations without reading parity associated with the one or more selected storage locations prior to writing data associated with the write operation directed to the one or more selected storage locations.

8. The parity protection system of claim 7, wherein the storage module configured to compute the new parity further comprises the storage module further configured to compute the new parity for a stripe of the parity protection system by performing an exclusive OR (XOR) operation with the data associated with the write operation directed to the one or more selected storage locations of the stripe.

9. The parity protection system of claim 7, wherein the new parity is computed without reading the zeroed storage locations.

10. The parity protection system of claim 7, wherein the free storage locations do not store data.

11. The parity protection system of claim 7, wherein the new parity is row parity.

12. The parity protection system of claim 7, wherein the new parity is diagonal parity.

13. A computer readable medium containing executable program instructions executed by a processor, comprising:
   program instructions that issue a zeroing command to cause free storage locations at a plurality of storage devices, of a storage system comprising a processor and a memory, to assume the zero value;
   program instructions that execute the zeroing command by causing the free storage locations identified by the command to assume the zero value;
   program instructions that receive a write operation directed to one or more selected storage locations; and
   program instructions that compute new parity for the storage system that contains zeroed storage locations without reading parity associated with the one or more selected storage locations prior to writing data associated with the write operation directed to the one or more selected storage locations.

14. The computer readable medium of claim 13, wherein the program instructions that compute the new parity further comprise program instructions that compute the new parity for a stripe of the storage system by performing an exclusive OR (XOR) operation with the data associated with the write operation directed to the one or more selected storage locations of the stripe.

15. The computer readable medium of claim 13, wherein the new parity is computed without reading the zeroed storage locations.

16. The computer readable medium of claim 13, wherein the free storage locations do not store data.

* * * * *

UNITED STATES PATENT AND TRADEMARK OFFICE
CERTIFICATE OF CORRECTION

PATENT NO.         : 8,156,282 B1
APPLICATION NO.    : 12/886746
DATED              : April 10, 2012
INVENTOR(S)        : James A. Taylor It is certified that error appears in the above-identified patent and that said Letters Patent is hereby corrected as shown below:

Col. 21, line 6 should read: "storage system, to assume ~~the~~a zero value;"

Col. 22, line 25 should read: "a memory, to assume ~~the~~a zero value;"

Signed and Sealed this
Tenth Day of July, 2012

David J. Kappos
*Director of the United States Patent and Trademark Office*